(12) United States Patent
Ben-Zvi et al.

(10) Patent No.: US 12,380,261 B2
(45) Date of Patent: Aug. 5, 2025

(54) APPARATUS AND METHOD FOR OIL PRODUCTION FORECASTING

(71) Applicant: Cenovus Energy Inc., Calgary (CA)

(72) Inventors: Amos Ben-Zvi, Calgary (CA); Seyide Hunyinbo, Calgary (CA); Juliana Y. Leung, Calgary (CA); Prince Azom, Calgary (CA)

(73) Assignee: Cenovus Energy Inc., Calgary (CA)

( * ) Notice: Subject to any disclaimer, the term of this patent is extended or adjusted under 35 U.S.C. 154(b) by 1028 days.

(21) Appl. No.: 17/358,447

(22) Filed: Jun. 25, 2021

(65) Prior Publication Data

US 2022/0414299 A1    Dec. 29, 2022

(51) Int. Cl.
  *G06F 30/27*    (2020.01)
  *E21B 43/12*    (2006.01)
  (Continued)

(52) U.S. Cl.
  CPC ............ *G06F 30/27* (2020.01); *E21B 43/128* (2013.01); *E21B 43/24* (2013.01); *E21B 47/008* (2020.05); *E21B 47/06* (2013.01); *E21B 49/00* (2013.01); *G06N 20/20* (2019.01); *E21B 2200/20* (2020.05); *G06F 2111/08* (2020.01); *G06N 5/01* (2023.01)

(58) Field of Classification Search
  CPC ...... G06F 30/27; G06F 2111/08; G06F 30/20; G06N 20/20; G06N 5/01; E21B 47/008; E21B 43/128; E21B 43/24; E21B 47/06; E21B 49/00; E21B 2200/20
  See application file for complete search history.

(56) References Cited

U.S. PATENT DOCUMENTS

2014/0365409 A1*  12/2014  Burch ............... E21B 41/00
                                                   706/12
2016/0312552 A1*  10/2016  Early ............... E21B 41/00
(Continued)

OTHER PUBLICATIONS

Almashan et al., "Estimating Pvt Properties of Crude Oil Systems Based on a Boosted Decision Tree Regression Modelling Scheme With K-means Clustering," Paper presented at the SPE/IATMI Asia Pacific Oil & Gas Conference and Exhibition, Oct. 2019.
(Continued)

*Primary Examiner* — Kibrom K Gebresilassie
(74) *Attorney, Agent, or Firm* — Gordon & Jacobson, P.C.

(57) ABSTRACT

A method and apparatus for forecasting oil production from an oil well in a geological formation includes receiving a plurality of sets of predicted geological data, for each of the plurality of sets of predicted geological data, determining a probability for the predicted geological data of the formation, iteratively selecting one of the plurality of sets of predicted geological data using Monte Carlo sampling based on the determined probabilities, assigning the selected set of predicted geological data to a cluster of historical data, and for each set of historical data of the cluster generating a predicted oil production rate as a function of time utilizing a machine learning based oil model, generating, based on the predicted oil production rates, a forecasted oil production rate, determining, based on the forecasted oil production rate, a preferred operating parameter for the well, and operating based on the preferred operating parameter.

21 Claims, 10 Drawing Sheets

(51) Int. Cl.
  E21B 43/24    (2006.01)
  E21B 47/008   (2012.01)
  E21B 47/06    (2012.01)
  E21B 49/00    (2006.01)
  G06N 20/20    (2019.01)
  G06F 111/08   (2020.01)
  G06N 5/01     (2023.01)

(56) References Cited

U.S. PATENT DOCUMENTS

| | | | | |
|---|---|---|---|---|
| 2017/0177992 | A1* | 6/2017 | Klie | E21B 43/00 |
| 2018/0087358 | A1* | 3/2018 | Conn | E21B 43/2406 |
| 2018/0087359 | A1* | 3/2018 | Conn | G05B 13/048 |
| 2020/0284944 | A1* | 9/2020 | Madasu | E21B 43/11 |
| 2022/0205354 | A1* | 6/2022 | Chaki | E21B 43/00 |

OTHER PUBLICATIONS

Amirian et al., "Integrated Cluster Analysis and Artificial Neural Network Modeling for Steam-assisted Gravity Drainage Performance Prediction in Heterogeneous Reservoirs, Expert Systems With Applications," 2014, vol. 42 (2015), pp. 723-740.

Aulia et al., "A New History Matching Sensitivity Analysis Framework With Random Forests and Plackett-burman Design," SPE Symposium: Production Enhancement and Cost Optimisation, 2017.

Bieker et al., "Optimal Well-testing Strategy for Production Optimization: a Monte Carlo Simulation Approach," Paper Presented at the Spe Eastern Regional Meeting, 2006.

Breiman et al., "Random Forests," Machine Learning, 2001, vol. 45, pp. 5-32.

Butler and Stephens., "The Gravity Drainage of Steam-heated Heavy Oil to Parallel Horizontal Wells," Journal of Canadian Petroleum Technology, 1981, vol. 20 (2), pp. 90-96.

Cenovus Energy Inc, (2018). Christiana Lake in-situ Progress Resport. https://www.aer.ca/providing-information/data-and-reports/activity-and-data/in-situ-performance-presentations.

Cenovus Energy Inc, 2019 Investors Day Presentation, Oct. 2, 2019.

Coimbra et al., "Practical Application of Pareto-based Multi-objective Optimization and Proxy Modeling for Steam Alternating Solvent Process Design," Paper presented at the SPE Western Regional Meeting, 2019.

Dehdari et al., "Calibrating a Semi-Analytic SAGD Forecasting Model to 3D Hetetogenous Reservoir Simulations," SPE Canada Heavy Oil Technical Conference Calgary, 2017.

Gilbert et al., "Reservoir Modeling: Integrating Various Data at Appropriate Scales," The Leading Edge, Aug. 2004, vol. 23 (8), pp. 784-788.

Gomez and Babadagli., "High-Temperature Solvent Injection for Heavy-Oil Recovery From Oil Sands: Determination of Optimal Application Conditions Through Genetic Algorithm," SPE Reservoir Evaluation and Engineering, May 2017, vol. 20, pp. 372-382.

Gosayir et al., "Design of Solvent-assisted Sagd Processes in Heterogeneous Reservoirs Using Hybrid Optimization Techniques," Presented at the Canadian Unconventional Resources Conference, 2011, vol. 2, pp. 1582-1593.

Guevara et al., "Optimization of Steam Injection for Heavy Oil Reservoirs Using Reinforcement Learning," In: In SPE International Heavy Oil Conference and Exhibition. Society of Petroleum Engineers, 2018.

Kubota et al., "Machine Learning Forecasts Oil Rate in Mature Onshore Field Jointly Driven by Water and Steam Injection the Mature Field Under Study : Oil Reservoir Under Simultaneous Water and Steam Injection," SPE Annual Technical Conference and Exhibition, 2019.

Liao et al., "Data Mining: A Novel Strategy for Production Forecast in Tight Hydrocarbon Resource in Canada by Random Forest Analysis," Institute of Petroleum Technology Conference, 2020.

Ma and Leung., "Design of Warm Solvent Injection Processes for Heterogeneous Heavy Oil Reservoirs: A Hybrid Workflow of Multi-Objective Optimization and Proxy Models," Society of Petroleum Engineers—SPE Reservoir Simulation Conference, 2019.

Ma and Leung., "Integration of Deep Learning and Data Analytics for SAGD Temperature and Production Analysis," Computational Geosciences, 2020, vol. 24, pp. 1239-1255.

Ma and Leung., "Knowledge-based Heterogeneity Characterization Framework for 3d Steam-assisted Gravity Drainage Reservoirs," Knowledge-Based Systems, 2020, vol. 192, 19 pages.

Ma and Leung., "Practical Implementation of Knowledge-based Approaches for Steam-Assisted Gravity Drainage Production Analysis, " Expert Systems with Applications, 2015, vol. 42 (21), pp. 7326-7343.

Ma et al., "Integration of Data-driven Modeling Techniques for Lean Zone and Shale Barrier Characterization in SAGD Reservoirs," Journal of Petroleum Science and Engineering, 2016, vol. 176, pp. 716-734.

Mathworks, (2020). Global Optimization Toolbox™ User's Guide. https://www.mathworks.com/help/releases/R2020b/pdf_doc/gads/gads.pdf.

Mathworks, (2020). Statistics and Machine Learning Toolbox™ User's Guide. https://www.mathworks.com/help/releases/R2020b/pdf_doc/stats/stats.pdf.

Mehana et al., "Integrating Production Analysis With Monte Carlo Simulation for Estimated Ultimate Recovery EUR Prediction," Paper Presented at the SPE Eastern Regional Meeting, Oct. 2019, pp. 15-17.

Millington et al., "Canadian Oil Sands Supply Costs and Development Projects (2015-2035)," Canadian Energy Research Institute (CERI). Study No. 152, Aug. 2015.

Mudhafar and Rao., Integrating Design of Experiments, Proxy Modeling, and Monte-Carlo Simulation for Combined Uncertainty Quantifications of Geological and Production Data in the Cyclic GAGD Process, Oct. 2016.

Muhammad et al., "Trees Vs Neurons: Comparison Between Random Forest and ANN for High-resolution Prediction of Building Energy Consumption," Energy and Buildings, Jul. 2017, vol. 145, pp. 77-89.

National Energy Board (2006). Canada's Oil Sands: Opportunities and Challengesto 2015: An Update, An Energy Market Assessment. Calgary, Alberta; 2006.

National Energy Board, (2020). Canada's Energy Future 2017 Supplement: Oil Sands Production. https://www.cer-rec.gc.ca/en/data-analysis/canada-energy-future/2017-oilsands/index.html.

Olalotiti-Lawal and Datta-Gupta., "A Multi-objective Markov Chain Monte Carlo Approach for History Matching and Uncertainty Quantification," Paper Presented at the SPE Annual Technical Conference and Exhibition, Journal of Petroleum Science and Engineering, 2018, vol. 166, pp. 759-777.

Russel et al., "Artificial Intelligence—A Modern Approach," Third Edition-Person Education, 2016.

Sibaweihi et al., "Real-time Steam Allocation Workflow Using Machine Learning for Digital Heavy Oil Reservoirs," Journal of Petroleum Science and Engineering, Apr. 2021, vol. 199, 22 pages.

Sivanandam et al., "Introduction to Genetic Algorithms," Springer-Verlag Berlin Heidelberg, 2008.

Zheng et al., "A Proxy Model for Predicting SAGD Production From Reservoirs Containing Shale Barriers," Journal of Energy Resources Technology, Transactions of the ASME, 2018, vol. 140 (12), 10 pages.

Zheng et al., "An Ai-based Workflow for Estimating Shale Barrier Configurations From SAGD Production Histories," Neural Computing and Applications, 2019, vol. 31, pp. 5273-5297.

* cited by examiner

APPARATUS AND METHOD FOR OIL PRODUCTION FORECASTING

FIELD

The present disclosure relates to oil production forecasting.

BACKGROUND

In oil production, reservoir simulation is an important aspect in determining whether recovery of the oil within a formation is financially viable and for oil field development planning.

Steam Assisted Gravity Drainage (SAGD) is one example of an oil production technique in which production forecasting is particularly useful. SAGD is a widely adopted in-situ bitumen recovery technique in, for example, Western Canada. The SAGD process involves the injection of high-quality steam into a reservoir to mobilize highly viscous heavy oil. The well configuration for this mechanism is designed in such a way that bitumen can be effectively drained under gravity. A horizontal producer well is located at the base of the reservoir while another horizontal injector well is drilled approximately 5 meters above the producer well. As steam is pumped into the reservoir, a steam chamber forms and expands. Bitumen is headed by the steam, reducing viscosity and making the bitumen more mobile. The heated oil drains along the steam chamber's edge under the influence of a gravitational force towards the producer well, where it is pumped to the service.

Because the recovery behavior of the SAGD process is sensitive to operational constraints and reservoir heterogeneity, a well-executed field development planning process and detailed optimization of pertinent decision variables is desired for efficient oil recovery. Proper field development planning and economic analysis are dependent on the ability to perform reliable forecasting of bitumen production. Conventionally, reservoir engineering techniques, such as reservoir simulation is commonly adopted for this purpose.

Performing reservoir simulation is, conventionally, computationally expensive and the non-uniqueness of a history matched reservoir model makes it difficult to have a single representation of reservoir dynamics, hence leading to periodic history matching. However, proxy models that are based the Butler's or modified Butler's model allow for quicker sensitivity studies and forecasting under multiple geostatistical realizations, but less accurate than reservoir simulation.

Improvements in SAGD production forecasting are desired.

BRIEF DESCRIPTION OF THE DRAWINGS

Embodiments of the present disclosure will now be described, by way of example only, with reference to the attached Figures.

DETAILED DESCRIPTION

Figure 1A:
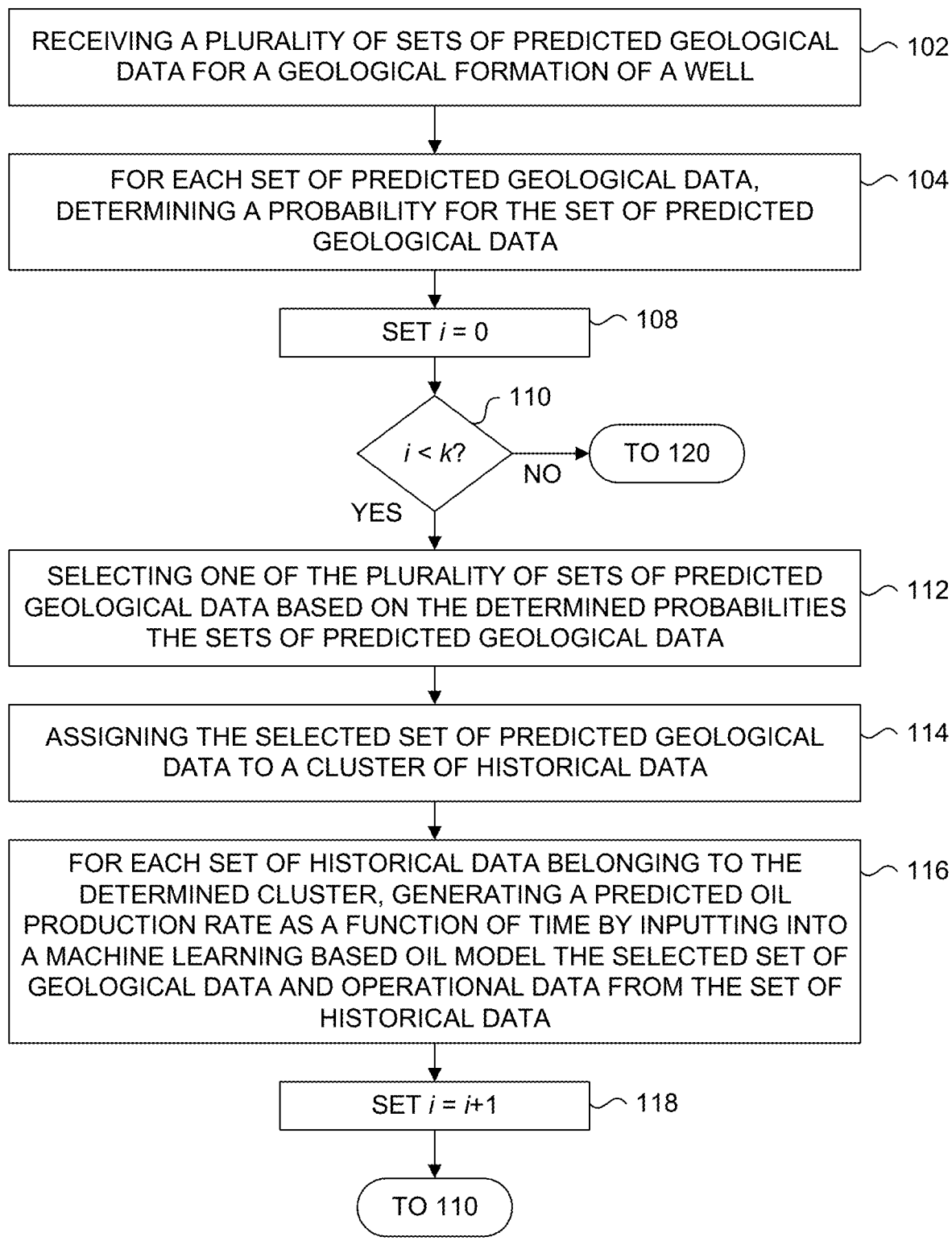
FIGS. 1A and 1B are a flow chart illustrating a method for generating a forecasted oil production rate as a function of time in accordance with an embodiment of the present disclosure.

Embodiments of the present disclosure relate to a method and an apparatus that utilizes machine learning modelling to forecast oil production based on historical oil production data. The forecasted oil production may be utilized to determine preferred operational parameters for producing oil. Further, the present disclosure provides that forecasting oil production includes quantifying uncertainty in both the operating conditions and geological conditions of the well under consideration.

It is noted that the term "oil" as used herein refers to any hydrocarbon containing fluid that is produced from a hydrocarbon bearing reservoir or formation, including, for example, emulsions that include hydrocarbons together with any or all of water, gas, solvents, or emulsifiers.

The present disclosure describes one example of utilizing the disclosed models in the context of forecasting oil production in context of SAGD oil production. However, in practice, the disclosed methods may be utilized to forecast oil production oil production that is other than SAGD, including production methods that do not utilize injectant, such as steam, water, solvent, gas, or any other fluid, that is injected into a formation during any stage of production.

In an embodiment, the present disclosure provides a method of forecasting oil production from an oil well in a geological formation that includes receiving a plurality of sets of predicted geological data for the geological formation, for each of the plurality of sets of predicted geological data, determining a probability for the predicted geological data of the formation repeating for k iterations: selecting one of the plurality of sets of predicted geological data using Monte Carlo sampling based on a probability distribution defined by the determined probabilities for each of the plurality of sets of predicted geological data, assigning the selected set of predicted geological data to a cluster of historical data to which the selected set of predicted geological data belongs, and for each set of historical data of the cluster to which the selected set of predicted geological data belongs generating a predicted oil production rate as a function of time by inputting into a machine learning based oil model geological data included in the selected set of predicted geological data and historical operational data from the set of historical data, generating, based on the predicted oil production rates as a function of time, a forecasted oil production rate as a function of time, where at a particular time the forecasted oil production rate is determined based on the predicted oil production rates at the particular time, and the forecasted oil production rate at the particular time having an uncertainty defined by a range of oil production rate values of the predicted oil production rates at the particular time determining, based on the forecasted oil production rate, a preferred operating parameter for the well, and operating the well based on the preferred operating parameter.

In an example embodiment, generating a predicted oil production rate as a function of time includes generating a predicted injectant rate as a function of time for the selected set of predicted geological data by inputting into a machine learning based injectant model geological data included in the selected set of predicted geological data and operational data from the historic data, and generating the predicted oil production rate as a function of time by inputting the predicted injectant rate as a function of time into the machine learning based oil model.

In an example embodiment, the method further includes generating, based on the predicted injectant rates as a function of time, a forecasted injectant rate as a function of time, where at a particular time the forecasted injectant rate is determined based on the predicted injectant rates at the particular time, and the forecasted injectant rate at the particular time having an uncertainty defined by a range of predicted injectant rate values at the particular time.

In an example embodiment, the method further includes receiving measured data from the well up to time t, the measured data including measured operational data and measured oil production rate data, and determining a probability for each of the plurality of sets of predicted geological data includes inputting the measured operational data, the predicted geological data into the machine learning based oil model to generate a predicted measured oil production rate as a function of time up to time t, and determining the probability for the set of predicted geological data based on a difference between the predicted measured oil production rate and the measured oil production rate.

In an example embodiment, generating the predicted oil production rate, for each set of historical geological data of the determined cluster to which the selected set of predicted geological data belongs, includes generating the predicted oil rate as a function of time for times greater than time t by inputting into a machine learning based oil model geological data included in the selected set of predicted geological data and historical operational data from the set of historical data and utilizing the predicted measured oil production rate as the predicted oil rate for times up to time t.

In an example embodiment, the method further includes determining that the measured production rate for a particular time is outside of the uncertainty of the forecasted oil production rate, and in response to determining that the measured production rate data for the particular time is outside of the uncertainty of the forecasted oil production rate, transmitting an alert.

In an example embodiment, the measured data includes measured injectant rate as a function of time up to time t, the method further comprising inputting the measured operational data, the predicted geological data into a machine learning based injectant model to generate a predicted injectant rate as a function of time up to time t, generating the predicted oil production rate, for each set of historical geological data of the determined cluster to which the selected set of predicted geological data belongs includes generating a predicted injectant rate as a function of time for the selected set of predicted geological data for time greater than time t by inputting into a machine learning based injectant model geological data included in the selected set of predicted geological data and operational data from the historic data, and generating the predicted oil production rate as a function of time by inputting the predicted injectant rate as a function of time for times up to time t and times greater than time t into the machine learning based oil model.

In an example embodiment, the method further includes generating, based on the predicted injectant rates as a function of time, a forecasted injectant rate as a function of time, where at a particular time the forecasted injectant rate is determined based on the predicted injectant rates at the particular time, and the forecasted injectant rate at the particular time having an uncertainty defined by a range of predicted injectant rate values at the particular time, determining that the measured injectant rate as a function of time for a particular time is outside of the uncertainty of the forecasted injectant rate for the particular time, and in response to determining that the measured injectant rate as a function of time for a particular time is outside of the uncertainty of the forecasted injectant rate, transmitting an alert.

In an example embodiment, the further includes generating, based on the predicted injectant rates as a function of time, a forecasted injectant rate as a function of time, where at a particular time the forecasted injectant rate is determined based on the predicted injectant rates at the particular time, and the forecasted injectant rate at the particular time having an uncertainty defined by a range of predicted injectant rate values at the particular time, and determining the preferred operating parameter comprises performing an optimization scheme utilizing the forecasted injectant rate as a function of time and the forecasted oil production rate as a function of time.

In an example embodiment, the injectant is steam, the time t of the measured data received is at least 12 months, the preferred operating parameter is bottom hole pressure, and the optimization scheme includes an economic objective function determination based on the cost of steam injected into the well in accordance with the forecasted injectant rate as a function of time and the value of the oil produced by the steam in accordance with the forecasted oil production rate.

In an example embodiment, the machine learning based oil model utilizes random forest machine learning.

In an example embodiment, each of the plurality of sets of predicted geological data of the formation include at least some of rich pay thickness, non-rich pay thickness, bottom water thickness, rich vertical permeability, non-rich vertical permeability, rich porosity, non-rich porosity, bottom water porosity, rich oil saturation, non-rich oil saturation, bottom water saturation, or permeability of bottom water zone.

In an example embodiment, the operational data from the sets of historical data includes at least some of production start data, electric submersible pump speed, or injector bottom hole pressure.

In another embodiment, the present disclosure provides an apparatus for forecasting oil production from an oil well in a geological formation that includes a memory for storing sets of historical data that is grouped together into clusters, a processor in communication with the memory, the processor configured to receive a plurality of sets of predicted geological data for the geological formation, for each of the plurality of sets of predicted geological data, determine a probability for the predicted geological data of the formation, repeat for k iterations: select one of the plurality of sets of predicted geological data using Monte Carlo sampling based on a probability distribution defined by the determined probabilities for each of the plurality of sets of predicted geological data, assign the selected set of predicted geological data to a cluster of historical data to which the selected set of predicted geological data belongs, and for each set of historical data of the cluster to which the selected set of predicted geological data belongs generate a predicted oil production rate as a function of time by inputting into a machine learning based oil model geological data included in the selected set of predicted geological data and historical operational data from the set of historical data, generate, based on the predicted oil production rates as a function of time, a forecasted oil production rate as a function of time, where at a particular time the forecasted oil production rate is determined based on the predicted oil production rates at the particular time, and the forecasted oil production rate at the particular time having an uncertainty defined by a range of oil production rate values of the predicted oil production rates at the particular time, determine, based on the forecasted oil production rate, a preferred operating parameter for the well, and operate the well based on the preferred operating parameter.

In an example embodiment, the processor configured to generate a predicted oil production rate as a function of time comprises the processor configured to generate a predicted injectant rate as a function of time for the selected set of predicted geological data by inputting into a machine learning based injectant model geological data included in the selected set of predicted geological data and operational data from the historic data, and generate the predicted oil production rate as a function of time by inputting the predicted injectant rate as a function of time into the machine learning based oil model.

In an example embodiment, the processor is further configured to generate, based on the predicted injectant rates as a function of time, a forecasted injectant rate as a function of time, where at a particular time the forecasted injectant rate is determined based on the predicted injectant rates at the particular time, and the forecasted injectant rate at the particular time having an uncertainty defined by a range of predicted injectant rate values at the particular time.

In an example embodiment, the processor further configured to receive measured data from the well up to time t, the measured data including measured operational data and measured oil production rate data, and the processor configured to determine a probability for each of the plurality of sets of predicted geological data comprises the processor configured to input the measured operational data, the predicted geological data into the machine learning based oil model to generate a predicted measured oil production rate as a function of time up to time, and determine the probability for the set of predicted geological data based on a difference between the predicted measured oil production rate and the measured oil production rate.

In an example embodiment, the processor configured to generate the predicted oil production rate, for each set of historical geological data of the determined cluster to which the selected set of predicted geological data belongs, comprises the processor configured to generate the predicted oil rate as a function of time for times greater than time t by inputting into a machine learning based oil model geological data included in the selected set of predicted geological data and historical operational data from the set of historical data and utilizing the predicted measured oil production rate as the predicted oil rate for times up to time t.

In an example embodiment, the processor is further configured to determine that the measured production rate for a particular time is outside of the uncertainty of the forecasted oil production rate, and in response to determining that the measured production rate data for the particular time is outside of the uncertainty of the forecasted oil production rate, transmit an alert.

In an example embodiment, the measured data includes measured injectant rate as a function of time up to time t, and the processor is further configured to input the measured operational data, the predicted geological data into a machine learning based injectant model to generate a predicted injectant rate as a function of time up to time t, and the processor configured to generate the predicted oil production rate, for each set of historical geological data of the determined cluster to which the selected set of predicted geological data belongs, comprises the processor configured to generate a predicted injectant rate as a function of time for the selected set of predicted geological data for time greater than time t by inputting into a machine learning based injectant model geological data included in the selected set of predicted geological data and operational data from the historic data, and generate the predicted oil production rate as a function of time by inputting the predicted injectant rate as a function of time for times up to time t and times greater than time t into the machine learning based oil model.

In an example embodiment, the processor is further configured to generate, based on the predicted injectant rates as a function of time, a forecasted injectant rate as a function of time, where at a particular time the forecasted injectant rate is determined based on the predicted injectant rates at the particular time, and the forecasted injectant rate at the particular time having an uncertainty defined by a range of predicted injectant rate values at the particular time, determine that the measured injectant rate as a function of time for a particular time is outside of the uncertainty of the forecasted injectant rate for the particular time, and in response to determining that the measured injectant rate as a function of time for a particular time is outside of the uncertainty of the forecasted injectant rate, transmit an alert.

In an example embodiment, the processor is further configured to generate, based on the predicted injectant rates as a function of time, a forecasted injectant rate as a function of time, where at a particular time the forecasted injectant rate is determined based on the predicted injectant rates at the particular time, and the forecasted injectant rate at the particular time having an uncertainty defined by a range of predicted injectant rate values at the particular time, and the processor configured to determine the preferred operating parameter comprises the processor configured to perform an optimization scheme utilizing the forecasted injectant rate as a function of time and the forecasted oil production rate as a function of time.

In an example embodiment, prior to receiving any measured data from the well, the processor configured to determine, for each of the plurality of sets of predicted geological data, a probability comprises the processor configured to determine the probability based on a ratio of the number of sets of historical data that is included within a type associated the set of predicted geological data to the total number of sets of historical data.

In an example embodiment, the machine learning based oil model utilizes random forest machine learning.

In an example embodiment, each of the plurality of sets of predicted geological data of the formation include at least some of rich pay thickness, non-rich pay thickness, bottom water thickness, rich vertical permeability, non-rich vertical permeability, rich porosity, non-rich porosity, bottom water porosity, rich oil saturation, non-rich oil saturation, bottom water saturation, or permeability of bottom water zone.

In an example embodiment, the operational data from the sets of historical data includes at least some of production start data, electric submersible pump speed, or injector bottom hole pressure.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described.

An automated approach to effective real-time field optimization and development planning has not been widely adopted in the industry. Conventional methods of forecasting oil production do not quantify uncertainty in the forecasts resulting from operational uncertainty and geological uncertainty, nor are they able to generate forecasts in real time as actual data from a well is being received. Operational uncertainty, as used herein, arises due to not operating a well optimally, if it can be assumed there is an optimal way to operate a well. Geological uncertainty, as used herein, arises due to incomplete ability to adequately sample the subsurface because a finite number of wells are drilled to map an entire field or reservoir.

Semi-analytical or proxy models have been proposed for field-wide planning and optimization. The governing equation in these models are typically based on Butler's model and hence they are computationally efficient. However, such models have not been widely adopted for several reasons. Firstly, it is difficult to incorporate changes in operational constraints into these models. Secondly, the model parameters must be estimated using real-world data. Indeed, even the model form may have to be modified if it cannot predict real-world production data. As a result, such models do not allow for real-time forecasting and uncertainty assessment as live production data is obtained.

Supervised and unsupervised machine learning methods have been applied to many aspects of petroleum engineering. However, unlike conventional uses of machine learning in petroleum engineering, the forecasts generated in accordance with the present disclosure couple geologic and operational uncertainty together into an uncertainty of the generated forecast.

The present disclosure describes utilizing a machine learning model to forecast oil production rate as a function of time based on predicted geological data for the formation and the operating conditions previously utilized to produce oil from formations that are geologically similar to predicted geological data. The forecasted oil production rate includes an uncertainty generated by incorporating both a geological uncertainty and an operational uncertainty, which is unlike convention methods for forecasting oil production.

The forecasted oil production rate is utilized in an optimization routine to determine preferred operating parameters for producing oil from the formation. The uncertainty associated with the forecasted oil production rate provides an uncertainty associated with the determined preferred operating parameters. The uncertainty associated with the determined preferred operating parameters facilitates assessing the reliability of the determined preferred operating parameters. Which assessment may be particularly useful at the early stages of oil production when operational and geological uncertainty may be the highest and, in turn, the determined preferred operating parameters may be the most unreliable.

The forecasted oil production rate may be updated as actual operational data from the wells is received, which may reduce the uncertainty associated with the updated forecasted oil production rate and, by extension, the preferred operating parameters determined through, for example, an optimization routine.

The forecasted oil production rates are generated using a machine learning based oil model. When forecasting oil production for production methods in which a fluid, referred to herein as an injectant, is injected into a well, a predicted injectant rate into the formation may be generated using a machine learning based injectant model. The predicted injectant rate may then be included as an input into the oil model to generate the forecasted oil production rate.

For example, in SAGD production, steam injection rate is an important variable that determines the forecasted oil production rate. Therefore, when forecasting SAGD production, a steam rate is determined utilizing a machine learning based injectant model, and that predicted steam rate is then utilized as an input into the machine learning based oil model to generate a predicted oil production rate, as described in more detail below.

The oil model, and injectant model if applicable, are trained utilizing historic well data. In an example, the machine learning based oil model, and injectant model if applicable, utilize a random forest algorithm.

Typically, decision tree algorithms are weak learners that may be prone to overfitting, and are generally not desirable algorithms for use as predictive learning tool. However, the random forest algorithm combines the simplicity of decision tree algorithms with more flexibility, which may result in better predictive accuracy compared to decision tree algorithms.

In one example for training the oil model, and injectant model if applicable, a bootstrapped dataset of the same size as the dataset of historic well data may be created by sampling with replacement, and depending on the number of decision trees, several bootstrapped samples may be used to train the trees. The average of the output variables over all trees may be utilized as the predicted output. Averaging the output variables may be referred to as an ensemble technique because the predictions from multiple decision trees are aggregated to yield a more accurate prediction. In particular, the bootstrap and aggregation techniques employed in the random forest algorithm may reduce the variability of decision trees.

The variables from the historic data that are selected for inputs into the oil model, and injectant model if applicable, may be based on the particular oil production method utilized in the well under consideration.

In one illustrative example of variables selected for forecasting a SAGD application, variables were selected from among 19 different variables, which may each be classified as dynamic or static. For example, four dynamic variables that may be utilized in the modelling are elapsed time, injector bottom-hole pressure, electric submersible pump (ESP) pump speed, and steam injection rate, and the 15 static variables may be a time-based well efficiency proxy, well spacing, rich pay thickness, non-rich pay thickness, bottom water thickness, stand-off, rich vertical permeability, non-rich vertical permeability, rich porosity, non-rich porosity, bottom water porosity, rich oil saturation, non-rich oil saturation, and bottom water oil saturation. Typically, the models are more sensitive to changes in dynamic variables compared to changes in the static variables.

In other examples, different inputs may be selected for training the machine learning based models based on, for example, the particular circumstances of the well being forecasted.

The time-based well efficiency proxy variable accounts for the difference in production efficiency over time due to operational strategies becoming more efficient. For example, a well that started operations in the year 2020 is expected to be more efficient, everything else being equal, than another well that started operations in 2000. Production start dates, or well efficiency proxy, of all the wells in the historic data utilized for training and validation were used as model predictors to account for the increase production efficiency in the historic data over time.

Elapsed time is an important attribute for forecasting oil production. For example, in SAGD applications, elapsed time is related to the different stages in a SAGD well pair's lifecycle, with each stage having a distinctive governing process. Steam injection rate is sensitive to injector bottom-hole pressure. An increase in injection pressure increases steam chamber temperature, because it is required to maintain steam at saturated conditions, which reduces bitumen viscosity. Because a decrease in viscosity drives bitumen drainage, a higher steam injection rate is expected for a given voidage replacement. The effect of injector bottom-hole pressure on latent heat and ultimately heat loss to overburden and underburden may affect steam efficiency. From a well performance perspective, instantaneous changes in ESP pump speed influences oil production rates locally in time.

In cases in which injectant is injected into the formation, separate random forest models are trained for the oil model and the injectant model. The training data may include well data, geologic data, daily injectant rate, oil production, and operational data from the historical data of the previously operated wells.

In training the oil model and injectant model for forecasting SAGD wells, the training data may be limited to a certain time period to avoid ramp down and blowdown physics, which is more complex to model. For example, in SAGD, approximately 3 years, or approximately 1000 days, of the historic data may be utilized for model training. In a SAGD production forecasting, elapsed time and injector bottom-hole pressure may be utilized as the dynamic parameters for the injectant model, and elapsed time, ESP pump speed, and steam injection rate may be utilized as the dynamic inputs for the oil model. Hence, steam injection rate is the output from the injectant model and an input into the oil model. Both models may preferably have the same static parameters. However, the static parameters of the oil model and injectant model may be different.

Before training the models, all the well-pairs of the historic data may be classified as one of a P10, P50 or P90 type well, and the predicted geologic data corresponding to the classified well type may be utilized as the geologic data for the well.

Typically, prior to initiating oil production, multiple sets of predicted geological data are prepared by geologists based on actual measurements of the formation. These sets of predicted geological data are utilized for oil field development planning. The measurements may include, for example, seismic measurements, test drilling measurements, core samples measurements, well logging measurements. Because it is not practical to perform the measurements required to determine the geological data of the formation precisely, geologists generally make predictions of what the geological data of the entire formation could be based on these finite number of measurements in order to fill in the gaps in the measured data.

In an example, the set of predicted geological data may include some or all of rich pay thickness, non-rich pay thickness, bottom water thickness, rich vertical permeability, rich porosity, non-rich porosity, bottom water porosity, rich oil saturation, non-rich oil saturation, bottom water oil saturation, permeability of bottom water zone, horizontal permeability, water saturation, lithology, and anisotropy ratio.

Generally, sets of predicted geological data represent different possible sets of geological data that range from a most optimistic set of geological data to a least optimistic set of geological data, consistent with the measurements of the formation. Conventionally, each set of predicted geological data may include a label of form PXX, where XX is a number indicating a percentage of wells that would be expected to have more desirable geological data from the perspective of oil production. For example, a set of predicted geological data labelled P10 may be used to label an optimistic set of geological data, indicating that only 10% of wells would be expected to have more desirable geological data. A set of predicted data labeled P50 may be used to label a most likely set of geological data, indicating that 50% of wells would be expected to have more desirable geological data, and 50% having less desirable geological data. A set of predicted data labelled P90 may be used to label a pessimistic set of geological data, indicating that 90% of wells would be expected to have more desirable geological data.

Together, the P10, P50, and P90 sets of predicted geological data may be utilized to establish, for example, best case, most likely case, and a worst case scenario for oil production from the well, which may then be utilized for well planning and risk assessment.

Although the examples described in the present disclosure describes three sets of predicted geological data, P10, P50, and P90, in practice any number of sets of predicted geological data may be received at 102. For example, the sets of predicted geological data may include P10, P20, P30, . . . , P80, and P90 sets of predicted geological data, or P5, P10, P15, . . . , P90, and P95 sets of predicted geological data.

Each of the wells included in the historic data utilized for training and verification may be assigned a well type by, for example, generating a forecasted production profiles for each of the P10, P50, and P90 predicted geological data sets, and assigning the well to the well type having forecasted production profile that best matches the actual production data for the well. The forecasted production profile may be generated based on a semi-analytical model. In this example, if a well's actual production data matches a P10 forecasted production profile better than a P50 and a P90 forecast production profile, then the well is classified as a P10 type well.

For SAGD, the classification of well-pairs may be based on a time period of data that excludes ramp down and blowdown stages such as, for example, 3 years of production data.

Prior to generating forecasted oil production rates utilizing the trained oil model, and injectant model if applicable, cluster analysis may be utilized to group the historic data into clusters based on similarities in geological data. In an example, the cluster analysis performed on the geological data includes first performing principal component analysis (PCA) on the geological data to reduce the dimensionality of the geological data sets, then clustering the reduced dimensionality data set utilizing K-means clustering.

PCA is a technique for dimensionality reduction of a dataset that includes projecting the dataset to a lower dimension space. In an example, a mean-adjusted dataset may determined by subtracting, for each variable, the mean value of that variable in all of the sets of geological data from the variable value of each set of geological data to eliminate bias. After subtracting the mean value for each variable, a singular value decomposition (SVD) method may utilized to estimate the eigenvalues and eigenvectors, also referred to as the principal components, of the covariance matrix of the data. The number of principal components that are retained may be determined by maintaining a variance explained by those principal components at a minimal level. In an example, the number of principal components retained may be selected such that at least 80% of the variance in the dataset is explained by the reduced dimensionality data set.

After PCA is performed, clustering analysis is performed on the reduced dimensionality sets of geological data to group the sets into clusters. In an example, K-means clustering analysis may be utilized. K-means clustering is an unsupervised learning technique that may be applied to anomaly detection, reservoir characterization oil, and production modelling. K-means clustering analysis identifies internal structures within data by dividing a set of items, in this case the reduced dimensionality sets of geological data for the wells, into clusters or sub-categories based on similarities in data. Observations are grouped into k-clusters based on similarities between them, and a measure of this similarity is the squared euclidean distance (SED). Cluster analysis may be performed by minimizing the cluster inertia or sum of squared errors (SSE).

To reduce the sensitivity of the K-means clustering analysis to the initialization of cluster centroids, a randomly initialization of the centroids followed by the clustering analysis may be performed until a desired partitioning is obtained.

In embodiments in which PCA and K-means cluster analysis is utilized, the number of clusters of the cluster analysis may be set to the number of principal components retained from the PCA.

Clustering analysis facilitates quantifying operational uncertainty by grouping wells with significant production history into clusters based on geological similarity. The operational parameters of a well within a cluster may be utilized to forecast oil production for any other well that within that cluster because wells within a cluster are expected to perform similarly for a given set of operational parameters due to the geological similarity in the wells.

Figure 1B:
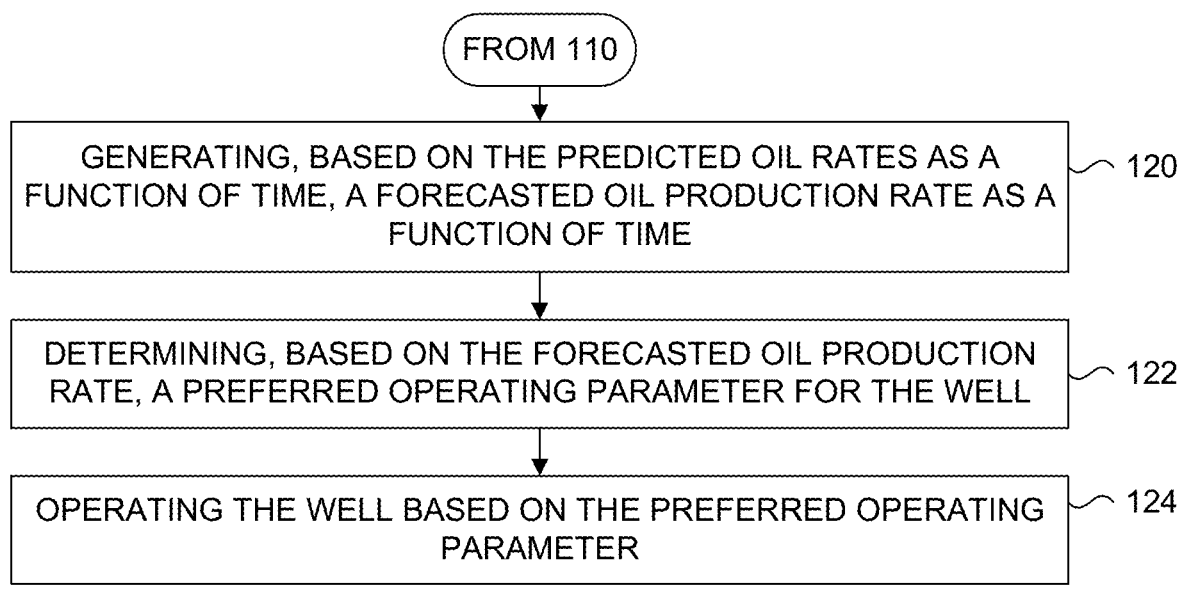

Referring to FIGS. 1A and 1B, a flow chart illustrating an example method for forecasting oil production in a geological formation is provided. The example method shown in FIGS. 1A and 1B may be performed by, for example, one or more processors of a computing device by performing instructions stored in a memory of the device. The method of forecasting oil production may include additional steps not shown in the example illustrated in FIGS. 1A and 1B, or the steps may be performed in an order that differs from the order shown in the example illustrated in FIGS. 1A and 1B.

At 102, a plurality of sets of predicted geological data for the formation of a well is received. As noted above, the sets of predicted geological data may have been determined based on measurements take of the formation. In the examples described here, the predicted sets of geological data may include P10, P50, and P90 sets. However, in practice any number of sets of predicted geological data may be utilized.

At 104, a probability for each of the sets of predicted geological data is determined.

In an example in which no actual production data has been received from the well, the initial probability of each of the sets of predicted geological data may be determined based on historic data. As noted above, each well included in the historic data may be classified based on well type, i.e., as a P10, P50, P90 well, for example. In an example, the initial probability determined at 104 for each of the P10, P50, and P90 sets of predicted geological data is determined as the likelihood of a P10, P50 or P90 type well occurrence based on the historic data such that:

$$P(P_{R_0}) = \frac{N_{P_R}}{N_{wells\_total}} \quad (1)$$

where subscript R denotes 10, 50, or 90, $P_R$ could represent P10, P50 or P90, such that, $P(P_{R_0})$ represents the probabilities for each of the three sets of predicted geological data, P10, P50, P90 at day 0. $N_{P_R}$ is the number of $P_R$ type wells in the historic data and $N_{wells\_total}$ is the total number of wells in the historic data.

In other examples, any other suitable method for determining the probability for each of the sets of predicted geological data may be utilized.

Eq. 1 is an example of a frequentist approach for determining an initial probability that utilizes simple counting. In other examples, other approaches for determining initial probabilities of the sets of predicted geological data may be utilized. For example, a Bayesian approach may be utilized in which the probabilities are determined based on intuition or experience.

As actual data is obtained from the well, the probability of each of the sets of predicted geological data may be updated based on the actual data, as described in more detail below.

In order to quantify operational and geological uncertainty in the forecasted oil production rate, an iterative process is utilized in the illustrated example. During each iteration, one of the plurality of sets of predicted geological data is randomly sampled, then a predicted oil rate as a function of time is generated for the selected set of predicted geological data utilizing operational data from the sets of historical data for each well having similar geology to the selected set of predicted geological data, as described in more detail below.

In order to iterate the generation of predicted oil production rates for k iterations, and index, i, is set to zero at 108. At 110, a determination of whether index, i, is less than the number of iterations, k, is made. If the determination at 110 is YES, then k iterations have not yet been performed and the process proceeds to 112.

At 112, one of the plurality of sets of predicted geological data is randomly selected based on the probabilities of the sets of predicted geological data determined at 104. For example, the probabilities determined at 104 may be used to form a probably distribution for the sets of predicted geological data and, based on this probability distribution, one of the sets of predicted geological data may be selected at random. The predicted geological data may be randomly selected utilizing a Monte Carlo sampling algorithm.

At 114, the selected set of predicted geological data is assigned to a cluster of the historic data based on the similarity of the geological data in the selected set of geological data compared to the geological data of the historic data included in each cluster.

As described previously, the sets of historical data are grouped into K clusters based on similarity in geological data utilizing clustering analysis. The cluster assignment may be performed on a combination of the selected predicted geological data and the measured well data for the well under consideration. For example, in a SAGD well, the predicted geological data may include rich pay thickness, non-rich pay thickness, bottom water thickness, rich vertical permeability, non-rich vertical permeability, rich porosity, non-rich porosity, bottom water porosity, rich oil saturation, non-rich oil saturation, and bottom water oil saturation, and the measured data for the well may include well spacing, stand-off, and effective well length. PCA may be performed on the predicted geological data and the measured well data together to generate the reduced dimensionality form.

For cluster assignment that includes performing PCA to generate a reduced dimensionality data set, assigning the selected set of predicted geological data at 114 may include performing PCA on the selected set of predicted geological data, then the reduced data set is compared to the clusters to determine which cluster the selected set is closest to.

As noted above, cluster assignment for a set of predicted geological data may include both the geological data included in the set of predicted geological data, as well as measured well data that is measured for the well under consideration. In this case, PCA is performed on the combination of the selected predicted geological data and the measured well data in order to generate the reduced data set.

In an example, the cluster assignment at 114 may be performed by determining the cluster whose centroid is closest to the dimensionality reduced data set generated from the selected set of predicted geological data, or the combination of the selected set of predicted geological data and the measured well data.

In some embodiments, rather than performing the cluster assignment during each iteration, each of the plurality of sets of predicted geological data may be assigned to a cluster once, and this assignment is utilized for assigning the selected set at 114. For example, the assigned cluster of each set of predicted geological data may be stored in association with the set of predicted geological data such as, for example, in a lookup table, or stored together with the set of predicted geological data. In this example, assigning the selected set of predicted geological data to a cluster at 114 may include determining which cluster the selected set was previously assigned to.

However, in other examples, the selected set of predicted geological data may be assigned to a cluster during each iteration by performing cluster assignment as set out previously.

Once cluster assignment of the selected set of predicted geological data has been performed at 114, a predicted oil production rate as a function of time is generated for each set of historical data that belongs to the assigned cluster at 116. The predicted oil production rate for a given set of historical data is determined by inputting into a machine learning based oil model geological data from the selected set of geological data, measured well data from the well under consideration, and the operational data from the set of historic data, as well as elapsed time. The data that is in input into the machine learning based oil model depends on the type of well, and production technique utilized, that oil production rates are being predicted for, but generally will be the same inputs utilized to train the model, as described previously.

For production that involves injecting an injectant into the formation, generating the predicted oil production rate for each set of historic data at 116 may include first generating a predicted injectant rate for each set of historic data that belongs to the assigned cluster. The predicted injectant rate may be generated by inputting into a machine learning based injectant model geological data from the selected set of geological data, measured well data from the well under consideration, and the operational data from the set of historic data, as well as elapsed time. The generated predicted injectant rate is then utilized as an input into the oil model to generate the predicted oil production rate.

Depending on production technique utilized, the machine learning based injectant model may be utilized to generate a predicted injectant rate for steam, water, solvent, gas, or any other fluid that is injected into the formation during the oil production process.

In the example of a SAGD production process, the predicted geological data that is input into the machine learning based injectant and oil models may be rich pay thickness, non-rich pay thickness, bottom water thickness, rich vertical permeability, non-rich vertical permeability, rich porosity, non-rich porosity, bottom water porosity, rich oil saturation, non-rich oil saturation, and bottom water oil saturation. The operational data from the historic data that is input into the machine learning based injectant model may be the injector bottom hole pressure and the operational data input into the machine learning based oil model may be the ESP speed. A time-based efficiency proxy based on the production start date included in the historic data may be input into both the machine learning based injectant and oil models. The measured well data that may be input into both the machine learning based injectant and oil models may include well spacing, stand-off, and effective well length. As noted previously, the injectant rate generated by the machine learning based injectant model is utilized as an input into the machine learning based oil model in addition to the other inputs set out above.

At 118, the index value, i, is increased in value by one and the process moves back to 110, where it is determined whether i is less than k. If YES, it means that k iterations of sampling the sets of predicted geological data and determining predicted oil production rates have not been performed, and steps 112 through 118 are repeated.

It is noted that if, on subsequent iterations, the set of predicted geological data that is selected at 112 is the same as a selected set of geological data from a previous iteration, then the process may skip ahead 118 to avoid performing the clustering assignment at 112 and generating the predicted oil production rates at 116 all over again. By avoiding this duplication of work the overall process may be made more efficient, reducing the processing bandwidth utilized by the method.

If the determination at 110 is NO, then k iterations have been performed and the process proceeds to 120. At 120, a forecasted oil production rate as a function of time is generated based on all of the predicted oil rates as a function of time generated during the k iterations of steps 112 to 116. The forecasted oil production rate includes an uncertainty that is defined by the range of values included in the predicted oil production rates determined previously. For example, the forecasted oil production rate at a particular time will have an uncertainty defined by the range of oil production rate values given by all of the predicted oil production rates generated in all iterations of steps 112 to 116 at the particular time.

In an example, the generated forecasted oil production rate as a function of time is, for any particular time, the median value of the oil production rate values for all of the predicted oil production rates generated in all iterations of steps 112 to 116 at the particular time. In other examples, other methods for determining the forecasted production rate based on the predicted oil production rates may be utilized such as, for example, an average value of all of the oil production rates at the particular time.

In examples in which selections of a set of predicted geological data that was selected in a previous iteration and resulted in skipping steps 114 and 116, as described previously, would be accounted for at 120 by including oil production rate values from the predicted oil production rates generated for that set of predicted geological data as many times as that set was selected during all k iterations.

For production techniques that include injecting an injectant into the formation, a forecasted injectant as a function of time may also be generated at 120 based on all of the predicted injectant rates generated during the k iterations of steps 112 to 116. The forecasted injectant rate may be generated similarly to the forecasted oil production rate, and may similarly include an uncertainty defined by the range of injectant rate values of given by all of the predicted injectant rates that were generated. In an example, the forecasted injectant rate as a function of time may be, for a particular time, the median of the injectant rate values for all of the predicted injectant rates generated during all of the k iterations of steps 112 to 116 at the particular time.

Iterative sampling the plurality of sets of predicted geological data based on the probabilities of the well best described by those sets provides an assessment of the geologic uncertainty. Utilizing the operational data of the historic data that is included in the cluster of a selected set of predicted geologic data provides an assessment of operational uncertainty by assuming that well-pairs that belong to a given geologic group or cluster are expected to be operated in a similar way. Variance in well operations for a given cluster may be utilized to indicate operational uncertainty. In this way, the uncertainty in the forecasted oil production data includes both the geological and operational uncertainty.

At 122, a preferred operating parameter is determined for the well based on the forecasted oil production rate generated at 120. In some embodiments, multiple preferred operating parameters may be determined at 122. The preferred operating parameter(s) determined at 122 may include, for example, any of the dynamic variables that input into the oil model. The preferred operating parameter may be determined at 122 utilizing an optimization routine in which forecasted oil production rates are determined while one or more operating parameters are varied with a view of increasing a ratio of the value of the oil produced to the cost of producing that oil.

In an example, the optimizing routine may determine the preferred operating parameter as the value of the operating parameter that maximizes an economic objective function for the group of wells in a reservoir. Determining the preferred operating parameter of a well at 122 may be performing based on the generated forecasted oil production rates of others wells in the same reservoir in order to optimize the allocation of resources between the wells.

In an example, determining the preferred operating parameter is performed by determining the net present value (NPV) for the wells in a reservoir, which considers the discounted value of cash flows, or profit, from the wells. The cash flow is the difference between the value of oil produced and the cost to produce oil.

In other examples, any other suitable economic objective function may be utilized such as, for example, a profit to investment ratio (PIR), or an internal rate of return (IRR).

A common optimization algorithm is the genetic algorithm (GA) in which solutions are represented as chromosomes which together form a population, which population is initialized randomly. Each chromosome is evaluated according to a fitness or objective function, which is a measure of how good a solution or chromosome is when compared to other solutions in the same population. In an example, a process of fitness-based selection of parent chromosomes and their recombination may be performed iteratively, and successive generations of the population are created with a decrease or increase in the fitness values of the chromosomes, depending on whether the optimization is a minimization or maximization problem, until a stopping criterion is met. GA may be desirable for use in as an optimization algorithm in the context of the present disclosure because GA may be better suited to handle noisy objective functions, and it may be utilized to identify global optima because it may have better resistance to becoming trapped in local optima when compared to other optimization algorithms, such as for example, gradient descent or a Levenberg-Marquardt algorithm.

A challenge with determining a preferred operating parameter from day 0, i.e., before any actual data from the well is available, is that the uncertainty, or confidence, band could be high for some well-pairs. To address this problem, a weighted determination of the preferred operating parameter may be utilized such that the greater the uncertainty for a well, the lesser the weight that should be applied to the determined preferred operating parameter for that well-pair when optimizing the preferred parameter among the well of the formation.

As time progresses, and due to updating the probabilities of the sets of predicted geological data, as described in more detail below with reference to FIGS. 2A and 2B, the uncertainty in the generated forecasted oil production rates become fairly constant or stable for each well-pair. Once the uncertainty has stabilized, the preferred operating parameter determinations may not be weighted and the determination can proceed as determined by an optimization algorithm, one example of which is described in more detail with reference to FIGS. 2A and 2B.

The preferred operating parameter determined at 122 may include an uncertainty. The uncertainty value of the determined preferred operating parameter is determined based on the uncertainty of the forecasted oil production rate.

In production techniques that include injecting an injectant into the formation, typically the injectant is the greatest source of production cost, and therefore the operating variable that optimized at 122 may be related to the injectant. For example, SAGD operations are typically steam constrained, and therefore steam allocation among the wells of a formation, which is related to the steam injection rate of each well, is typically the most important operating parameter. Due to the correlation between steam injection rate and injector bottom-hole pressure, a preferred value for the injector bottom-hole pressure of a well may be determined at 122 as the preferred operating parameter. It is assumed that determining the preferred injector bottom-hole pressure at 122 results in the preferred steam injection rate is applied to the well. In other techniques in which the injectant is other than steam, such as for example, water or gas, the injector bottom hole pressure may similarly be the parameter that determined as the preferred operating parameter at 122.

In production techniques that do not include injecting an injectant into the formation other preferred parameters may be determined at 122. For example, it may be desired to determine a preferred oil production rate in order to attempt to produce as much oil from the reservoir as possible. As oil is produced, the pressure of the reservoir, which may be estimated from the wellhead or producer bottomhole pressure measurements, reduces. When the reservoir pressure drops to a threshold level, the reservoir will have insufficient pressure for additional oil to be pumped to the surface. In these examples, maximizing oil production may be facilitated by determining a preferred producer bottomhole pressure, or ESP pump speed, or both, as the preferred operating parameter.

Below is one example of performing optimization for a production technique in which an injectant is injected in the formation, such as SAGD production, and in which the uncertainty of the updated forecasted oil production rates for the wells in a formation have not become sufficiently stable, such as before any measured production or injectant injection rates data from the well is received. The following example optimization process may be utilized to allocate steam among the wells of the formation by optimizing the injector bottom-hole pressure of the wells.

The present example utilizes a GA and is based on the NPV economic objective function. It is noted that, because GA is commonly used for minimization problems while the objective here is to maximize NPV, the objective function is defined as 1/NPV and a minimization is performed.

As noted previously, GA is an algorithm in which solutions are represented as chromosomes, the chromosomes together forming a population that is initialized randomly. Each chromosome is evaluated according to a fitness or objective function, which is a measure of how good a solution or chromosome is when compared to other solutions in the same population. In an example, a process of fitness-based selection of parent chromosomes and their recombination may be performed iteratively, and successive generations of the population are created with a decrease or increase in the fitness values of the chromosomes, depending on whether the optimization is a minimization or maximization problem, until a stopping criterion is met.

Because no production may be available, or the uncertainty in the forecasted oil production rate is not sufficiently stabilized to facilitate a sufficiently reliable comparison between measured data and forecasted data, steam optimization in the present example is performed utilizing the P50 set of predicted geological data. As described previously, the P50 set of predicted geological data is the most likely occurrence and therefore it is selected in the absence of measured production data over a sufficient time period. In other examples, the optimization process may be performed by selecting one of the sets of predicted geological data, i.e., P10, P50 or P90, utilizing Monte Carlo sampling based on a probability distribution defined by the determined initial probabilities, $P(P_{R_0})$.

The minimization problem may be formulated as follows. The decision variables are given by:

$$[P_{inj}] = \begin{bmatrix} P_{inj_{1,1}} & P_{inj_{1,2}} & \cdots & P_{inj_{1,z}} \\ . & . & \cdots & \cdots \\ P_{inj_{m,1}} & P_{inj_{m,2}} & \cdots & P_{inj_{m,z}} \end{bmatrix} \quad (2)$$

where $[P_{inj}]$ denotes the decision matrix and $P_{inj_{m,z}}$ is the injector bottom-hole pressure for well n at month m. In an example in which there are 10 well-pairs and 2 months for which forecasts are made, the number of decision variables is 20 (10 well-pairs×2 months forecast period/well pair). Eqn. 2 can be expressed in the vectorized form as:

$$\vec{v} = [v_1\ v_2 \ldots v_{z \times m}] = [P_{inj_{1,1}} \ldots P_{inj_{m,1}}\ P_{inj_{1,2}} \ldots P_{inj_{m,2}} \ldots P_{inj_{1,z}} \ldots P_{inj_{m,z}}] \quad (3)$$

where $\vec{v}$ is the decision vector. The objective function, $f(\vec{v})$ is defined as:

$$f(\vec{v}) = \left[\frac{1}{NPV}\right] \quad (4)$$

NPV, assuming there are no initial investments, is calculated as:

$$NPV = \sum_{i=1}^{m} \frac{6.2898 \cdot \left[\left(\sum_{k}^{N_{wells}} Q_{o_i}\right) \cdot P_{WCS} - \left(\sum_{k}^{N_{wells}} Q_{s_i}\right) \cdot \frac{X_{inject}}{cSOR_{avg}}\right]}{(1+r)^i} \quad (5)$$

where $Q_{o_i}$ and $Q_{s_i}$ are the total oil production and injectant injection volumes (in m³) for month i (assuming there are 30 days in a month), $P_{WCS}$ is the price of produced oil per barrel, which for SAGD production in Western Canada may be the price per barrel of Western Canadian Select oil grade, $X_{inject}$ is the cost of injectant (per barrel of oil), $cSOR_{avg}$ is the average cumulative injectant-to-oil ratio across SAGD wells, $N_{wells}$ denotes the total number of well-pairs and r is the monthly discount rate.

In an example, 6.2898 is the conversion rate from barrel to m³, and $P_{WCS}$, $X_{inject}$, $cSOR_{avg}$ and r are assumed to be equal to $25/bbl., $2.5/bbl., 2.5 bbl./bbl. and 9% respectively. Usually discount rates are per annum, hence the conversion of an annual discount rate to a monthly rate is given in Eqn. 6 below:

$$r = (1+d)^{\frac{1}{12}} - 1 \quad (6)$$

d denotes the annual compound discount rate.

In an example, the optimization process is run using the following parameters, with the initial population created using a uniform probability distribution.

| Parameter | Value |
| --- | --- |
| Population size | 50 |
| Number of generations | 35 |
| Mutation operator | Gaussian |
| Crossover operator | Scattered |
| Number of decision variables | 20 |

Because oil production includes injecting an injectant into the formation, such as SAGD, is typically constrained by the injectant, it may be desirable to add injectant as a constraint to the loss function of the machine learning based injectant model used to resolve an optimization problem. However, the random forest method does not facilitate easy access to the prediction loss function compared to other techniques such as a Long Short Term Memory network (LSTM). Therefore, it may be desired in the method disclosed herein to set an upper and a lower bound of the decision vector, i.e., a proxy for injection constraint, using the operational data for previously operated well-pairs. The operational data may be from, for example, a subset of the training dataset utilized to train the machine learning based models. To define the lower and upper bounds of the decision vector for each of the well pairs, for each set of predicted geological data (P10, P50 and P90), cluster assignment may be performed for each well included in the optimization process, and select n injector bottom-hole pressure measurements considered between month, m and month, m+2, where m=0, 2, 4, 6, . . . , 32) from the previously operated well-pairs that are within the same cluster as each of the well-pairs, hence, there are 3×n injector bottom-hole pressure measurements for each well-pair.

The lower bound may be set to, for example, the 10th percentile of the 3×n injector bottom-hole pressure measurements, and the upper bound may be set to, for example, the 90th percentile of the 3×n injector bottom-hole pressure measurements. To establish a baseline for comparison, a base case may be generated based on the median injector bottom-hole pressure.

In this example process for performing optimization, operational uncertainty is included the determination of the lower and upper bounds of the decision variable, which in the present example is the injector bottom-hole pressure.

While the above illustrative example is described in the context of optimizing bottom-hole pressure, this process could be modified to performing optimization of any other suitable operating parameter, including operating parameters in the context of production techniques that do not utilize an injectant injected into the formation.

At 124, the well is operated based on the preferred operating parameter that is determined at 122. Operating the well at 124 may be based on the uncertainty of the preferred operating parameter such that, if the uncertainty associated with the determined preferred operating parameter is high, the preferred operating parameter may be ignored. For example, if the determined preferred operating parameter is significantly different from the current operating parameter of the well and the uncertainty of the preferred operating parameter is high, such as if the difference between the determined preferred and current operating parameters meets a first threshold and the uncertainty in the preferred operating parameter meets a second threshold, then the preferred operating parameter may not be implemented in the well. For example, the well may be maintained at the current operating parameter, or the operating parameter may be varied by an amount that is related to the uncertainty such that, for example, the larger the uncertainty, the smaller the variance in the operating parameter that is implemented.

An advantage of the presently disclosed machine learning based modelling compared to computationally intensive numerical simulations is the ability to generate forecasted oil production rates as a function of time in real time as actual data from a well is received. Forecasting the oil production rate in real time facilitates optimizing the operating parameter of a well in real time. The actual data received from the well is utilized to generate more accurate forecasted oil production rates, with reduced uncertainty, over time by updating the probabilities for each of the sets of predicted geological data.

Figure 2A:
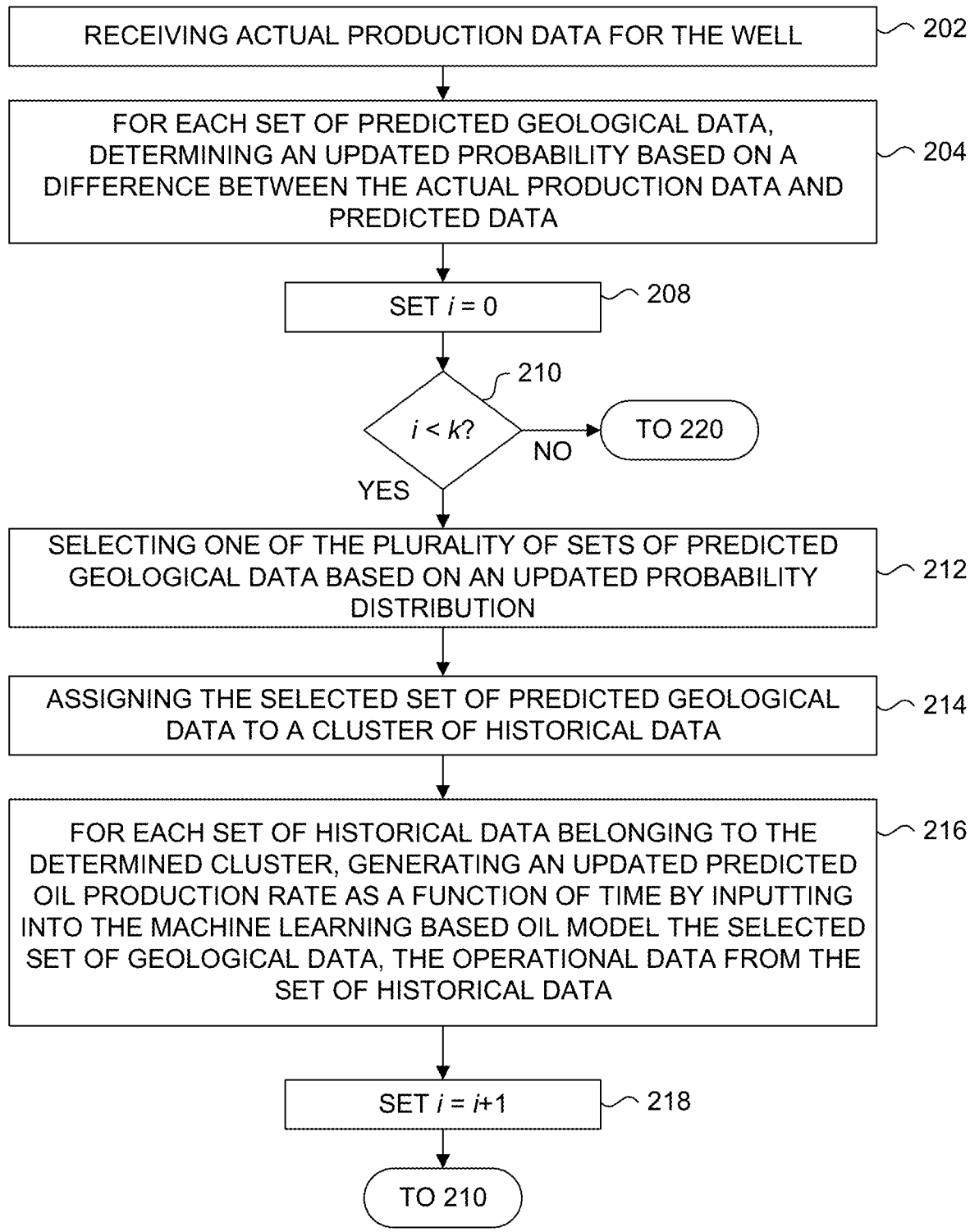
FIGS. 2A and 2B are a flow chart illustrating a method for generating an updated forecasted oil production rate as a function of time in accordance with another embodiment of the present disclosure.
Figure 2B:
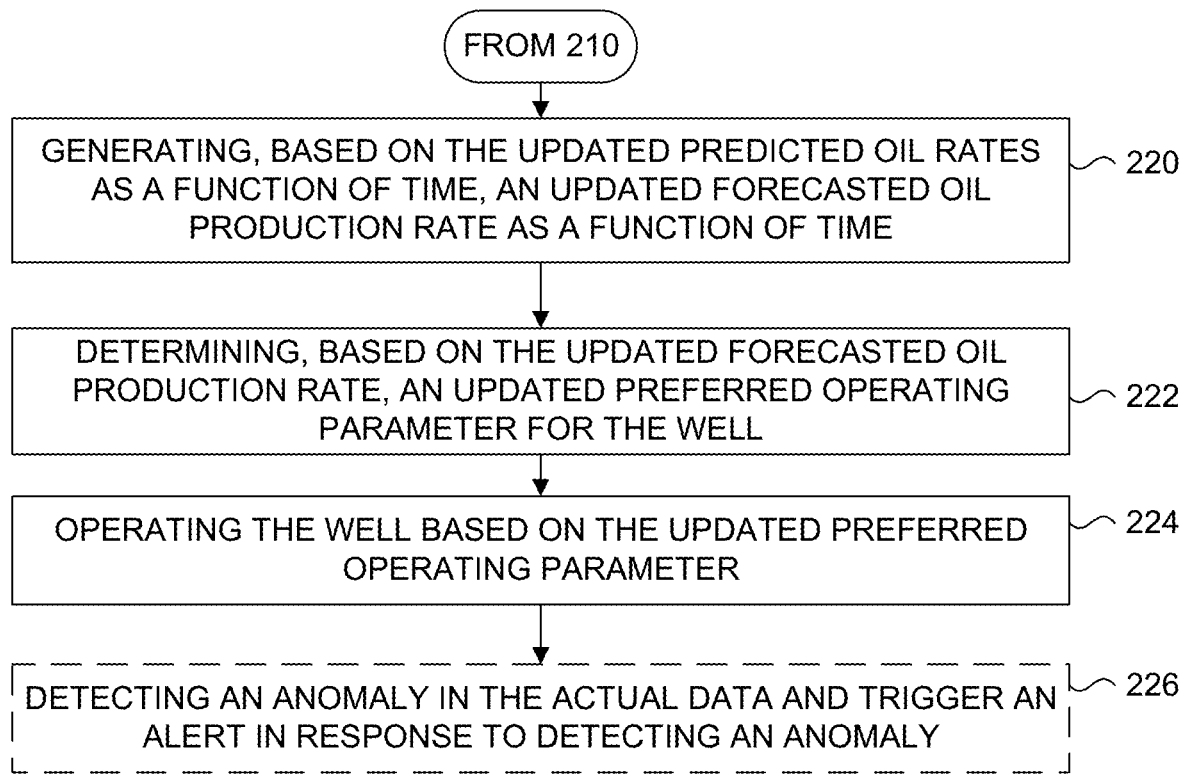

Referring now to FIGS. 2A and 2B, a flow chart illustrating an example method of updating a forecasted oil production rate as a function of time based on received actual data from a well is shown. The example method illustrated in FIGS. 2A and 2B may be performed by, for example, one or more processors of a computing device by performing instructions stored in a memory of the device. The method of forecasting oil production may include additional steps not shown in the example illustrated in FIGS. 2A and 2B, or the steps may be performed in an order that differs from the order shown in the example illustrated in FIGS. 2A and 2B.

At 202, actual data from the well is received. The actual data that is received may include the operating data of the well, and oil production rate at various times. For production techniques that inject an injectant into the formation, the actual data may include injectant rate. For example, in the example of a SAGD well, the actual data that is received may include injector bottom-hole pressure, ESP pump speed, steam injection rate, and oil production rate at various times. In other examples, additional data may be included in the actual data that is received such as, for example, any of temperature data, casing gas rate, wellhead pressure, and ESP current.

At 204, an updated probability for each of the plurality of sets of predicted geological data for the well is determined. For each set of predicted geological data, the updated probability is determined based on a difference between the oil production rate included in the actual data and a predicted oil production rate generated using the oil model for that set of predicted geological data. In this case, the smaller the difference between the actual oil production rate and the predicted oil production rate, the greater the probability.

In an example, the predicted oil production rates may be determined by inputting into the machine learning based oil model, operational data from the received actual data and geological data from the set of predicted geological data for which the probability is being determined.

In examples in which injectant is injected into the well, determining the predicted oil production rate utilizing operating data included in the received actual data may include determining a predicted injectant rate by inputting into a machine learning based injectant model operation data from the actual data and geological data from the set of predicted geological data for which the probability is being determined. This predicted injectant rate may then be utilized as input into the machine learning based oil model to generate the predicted oil production data.

Alternatively, or additionally to determining probability by comparing actual oil production rates to predicted oil production rates, the probability may be determined based on comparing the actual injectant rate from the received actual data to a predicted injectant rate.

In an example of updating the probabilities at 204, the initial probabilities, ($P_{R_0}$), determined using Eq. (1) set out above, are updated to posterior probability $P(P_{R_0}|P_{R_t})$. $P(P_{R_0}|P_{R_t})$ represents the probability of a well being classified as a well type $P_R$ at day zero conditional to its classification based on production data collected up to day t. In general, $P(P_{R_0}|P_{R_t})$ represents a probability for each set of predicted geological data, which may in practice be greater than 3.

Determining $P(P_{R_0}|P_{R_t})$ includes first determining, for each set of predicted geological data, the deviation, $e_{P_R}$, of the actual oil production rate, from the actual data received at 202, with the predicted oil production rate data for the set of predicted geological data generated utilizing the oil model is determined as follows:

$$e_{P_R} = \frac{\left| \sum_{i=1}^{n} \left( q_{o_{P_R}}^{predicted,i} - q_o^{actual,i} \right) \right|}{n} \quad (7)$$

where, n is the number of production timesteps of $\Delta t$ (i.e., $t = x\Delta t$) included in the actual data $q_{o_{P_R}}^{predicted,i}$ is the predicted oil production rate for the set of predicted geological data, $P_R$, at timestep i, and $q_o^{actual,i}$ is the actual oil production data at time i from the actual data received.

From Eqn. 7, $P(P_{R_0}|P_{R_t})$ may be determined as follows:

$$P(P_{R_0}|P_{R_t}) = \frac{P(P_{R_t}|P_{R_0})P(P_{R_0})}{P_{R_t}} \quad (8)$$

where $P(P_{R_t}|P_{R_0})$ is the likelihood function or the conditional probability that a well is a $P_R$ type well after producing up until day t, given $P_{R0}$, which is determined as follow:

$$P(P_{R_t}|P_{R_0}) = \frac{\frac{1}{e_{P_R}}}{\frac{1}{e_{P_{10}}} + \frac{1}{e_{P_{50}}} + \frac{1}{e_{P_{90}}}} \quad (9)$$

Eq. 8 can also be expressed as:

$$P(P_{R_0}|P_{R_t}) = \frac{P(P_{R_t}|P_{R_0})P(P_{R_0})}{P(P_{R_t}|P_{10_0})P(P_{10_0}) + P(P_{R_t}|P_{50_0})P(P_{50_0}) + P(P_{R_t}|P_{90_0})P(P_{90_0})} \quad (10)$$

Because the denominator in Eq. 10 cannot be assessed easily, a normalization constant, $\alpha$ is used. Hence, $P(P_{R_0}|P_{R_t})$ is calculated by computing the terms within the angle brackets, followed by normalization as shown in Eq. 11:

$$P(P_{R_0}|P_{R_t}) = \alpha \langle P(P_{R_t}|P_{R_0})P(P_{R_0}) \rangle \quad (11)$$

Because these steps of updating the probability of each of the sets of predicted geological data is repeated as data is obtained, there is a resulting change in $P(P_{R_0}|P_{R_t})$ with time.

As with determining the forecasted oil production rate in the method illustrated in FIGS. 1A and 1B, an iterative process is similarly utilized to generate the updated forecasted oil production rate in which, during each of k iterations, one of the plurality of sets of predicted geological data is randomly sampled based on the updated probabilities of the plurality of sets of predicted geological data.

In order to iterate the generation of predicted oil production rates for k iterations, an index, i, is set to zero at 208, a determination of whether index, i, is less than the number of iterations, k, is made at 210. If the at 210 determination is NO, the process moves to 220 and if the determination at 210 is YES, then k iterations have not yet been performed and the process proceeds to 212.

At 212, one of the plurality of sets of predicted geological data is randomly selected based on a probability distribution defined by the updated probabilities of the sets of predicted geological data that were determined at 204. The random selection at 212 may be performed utilizing a Monte Carlo sampling algorithm as described previously with reference to step 112 of the method illustrated in FIGS. 1A and 1B.

At 214, the selected set of predicted geological data is assigned to a cluster of historical data. The assignment at 214 may be performed similarly to the assignment at 114, as previously described with reference to FIGS. 1A and 1B and therefore is not further described here to avoid repetition.

Once the selected set of predicted geological data is assigned to a cluster at 214, an updated predicted oil production rate as a function of time is generated for each set of historical data that belongs to the determined cluster at 216. The updated predicted oil production rate for a given set of historical data is determined by inputting into the machine learning based oil model the selected set of predicted geological data, operational data from the set of historic data. For production techniques in which injectant is injected into the formation, a predicted injectant rate may be determined by inputting the geological data from the selected set of geological data, and the operating data from the historic data of the assigned cluster, into a machine learning based injectant model. The predicted injectant rate is input into the machine learning based oil model to generate the predicted oil production rate.

The generation of the predicted oil production rates, and the predicted injectant rate if applicable, may be substantially similar to the generation of the predicted oil production rates, and the predicted injectant rate if applicable, at 116, described previously with reference to FIGS. 1A and 1B.

However, if the received actual data includes data up to a time t, then in some examples, the generation of the predicted oil production rates may be performed for times greater than time t, and the predicted oil rate generated utilizing operating parameters from the received actual data at 204, as described above, may be utilized as the predicted oil rate for time 0 up to time t. Similarly, where an predicted injectant rate is determined, the predicted injectant rate generated utilizing operating parameters from the received actual data at 204, as described above, may be utilized as the predicted injectant rate for time 0 up to time t.

At 218, the index value, i, is increased in value by one, and at 210 it is determined whether i is less than k. If YES, it means that k iterations of sampling the sets of predicted geological data and determining predicted oil production rates have not been performed, and steps 212 through 218 are repeated.

It is noted that if, on subsequent iterations, the set of predicted geological data that is selected at 212 is the same as a selected set of geological data from a previous iteration, then the process may skip ahead 218 to avoid performing the assignment of the cluster at 212 and generating the same updated predicted oil production rates at 216 again in order to reduce the processing bandwidth utilized by the method.

If the determination at 210 is NO, then k iterations have been performed and the process proceeds to 220. At 220, an updated forecasted oil production rate as a function of time is generated based on all of the updated predicted oil rates as a function of time generated during the previous k iterations of steps 212 to 216. The updated forecasted oil production rate includes an uncertainty, and is generated similarly to the generation of the forecasted oil production rate at 120 described above, and therefore is not described further to avoid repetition.

For production techniques that inject an injectant into the formation, an updated forecasted injection rate as a function of time may also be generated based on all of the updated predicted injectant rates as a function of time generated during the previous k iterations of steps 212 to 216. The updated forecasted injectant rate may include an uncertainty, and is generated similarly to the generation of the forecasted injectant rate at 120 described above, and therefore is not described further to avoid repetition.

At 222, an updated preferred operating parameter for the well is determined. As with the determining the preferred operating parameter at 122 describe previously, determining the updated preferred operating parameter may be performed utilizing an optimization routine. The determination of the updated preferred operating parameter at 222 may be determined similarly to the determination of the preferred operating parameter described previously with reference to 122 of the method illustrated in FIGS. 1A and 1B.

As noted previously, the uncertainty in the generated updated forecasted oil production rate may stabilize after actual data over a sufficient time period has been received. In some examples, the uncertainty in the updated forecasted oil production rate has sufficiently stabilized after actual data collected over 12 months of production is received and utilized to generate the updated forecasted oil production rate.

The uncertainty may be determined to be sufficiently stable in any suitable manner. In an example, the uncertainty may be determined to be sufficiently stable when each of the updated probabilities determined at 204 differ from previously determined probabilities by less than a threshold amount.

In another example, the uncertainty may be determined to be sufficiently stable when the uncertainty associated with an updated forecasted oil production rate, generated at 220, differs from a previously generated forecasted oil production rate by less than a threshold amount. Additionally or alternatively, in cases in which an injectant is injected, the uncertainty may be determined to be stabilized when the uncertainty associated with an updated forecasted injectant rate, generated at 220, differs from a previously generated forecasted injectant rate by less than a threshold amount.

In the case of production in which an injectant is injected in the formation, such as SAGD production, and in which the uncertainty of the updated forecasted oil production rates for the wells in a formation have become sufficiently stable, the following example optimization process may be utilized to allocate steam among the wells of the formation by optimizing the injector bottom-hole pressure of the wells.

The present example is performed substantially similar to the example describe previously utilizing Eqn. 2-6. However, instead of choosing the P50 set of predicted geological data, or selecting one of the sets of predicted geological data utilizing Monte Carlo sampling, the set of predicted geologic data that provides the least deviation between actual measured production rate data and generated predicted production rate, starting from time 0 up to the 12th month, is selected for each well-pair for the purposes of optimization. The generated predicted production rate may be, for example, the predicted production rate that is generated at 204 utilizing the predicted geological data and the operating data from the actual data received at 202, as described above.

Here, the 12 month period utilized for selecting the set of predicted geological is based on an assumption that 12 months of measured production data is desirable for uncertainty stabilization to be reached. In an example, optimal forecasted oil production rates are generated for the 22 months that follow stabilization using the selected set of predicted geological data, hence, the example optimization is based on a 22-month forecast period, starting from the 13th month. In other examples, however, stabilization may occur before or after 12 months from production in a well starting, and the forecasting period may be longer or shorter than 22-months after uncertainty stabilization is reached.

Once a set of predicted geological data is selected, the decision matrix, $[P_{inj}]$, may be generated according to Eqn. 2, as described above. In an example in which there are 10 well-pairs and 22 months for which forecasts are made, the number of decision variables is 220 (10 well-pairs×22 months forecast period/well pair).

Once the decision matrix, $[P_{inj}]$, is generated, the process proceeds similar to as described above utilizing Eqn. 3 to 6. Upper and lower bounds of the decision vector may be determined as described previously.

In an example, the optimization process according to the present example is run using the following parameters, with the initial population created using a uniform probability distribution.

| Parameter | Value |
| --- | --- |
| Population size | 50 |
| Number of generations | 50 |
| Mutation operator | Gaussian |
| Crossover operator | Scattered |
| Number of decision variables | 220 |

While the above illustrative example is described in the context of optimizing bottom-hole pressure, this process could be modified to performing optimization of any other suitable operating parameter, including operating parameters in the context of production techniques that do not utilize an injectant injected into the formation.

At 224, the well is operated in accordance with the updated preferred operation parameter. Operating the well at 224 may be based on the uncertainty of the updated preferred operating parameter such that, if the uncertainty associated with the determined preferred operating parameter is high, the preferred operating parameter may be ignored. For example, if the determined preferred operating parameter is significantly different from the current operating parameter of the well and the uncertainty of the preferred operating parameter is high, such as if the difference between the determined preferred and current operating parameters meets a first threshold and the uncertainty in the preferred operating parameter meets a second threshold, then the preferred operating parameter may not be implemented in the well. For example, the well may be maintained at the current operating parameter, or the operating parameter may be varied by an amount that is related to the uncertainty such that, for example, the larger the uncertainty, the smaller the variance in the operating parameter that is implemented.

At 226, an anomaly in the received actual data may be determined, and in response to determining an anomaly, an alert is triggered. An anomaly may be detected if, for example, an oil production rate at a particular time lies outside of the uncertainty of the updated forecasted oil production rate generated after receiving the actual data, or outside of the uncertainty of the forecasted oil production rate generated prior to receiving the actual. For production techniques that inject an injectant into the formation, such as SAGD, an anomaly may be detected when the actual injectant rate at a particular time lies outside of an uncertainty of the updated forecasted injectant rate generated after receiving the actual data, or outside of the uncertainty of a forecasted injectant rate generated prior to receiving the actual data.

In an example in which the anomaly is detected based on a forecasted oil production rate, or forecasted injectant rate if applicable, generated before receiving the actual data, the detection at 226 may occur prior to generating the updated forecasted oil production rate. For example, the anomaly may be detected immediately after the actual data is received at 204.

Triggering an alert may include sending an electronic message to one or more recipients indicating that an anomaly is detected. Alternatively, or additionally, the triggering an alert may include providing any visual or auditory alert at one or more electronic devices.

Figure 3:
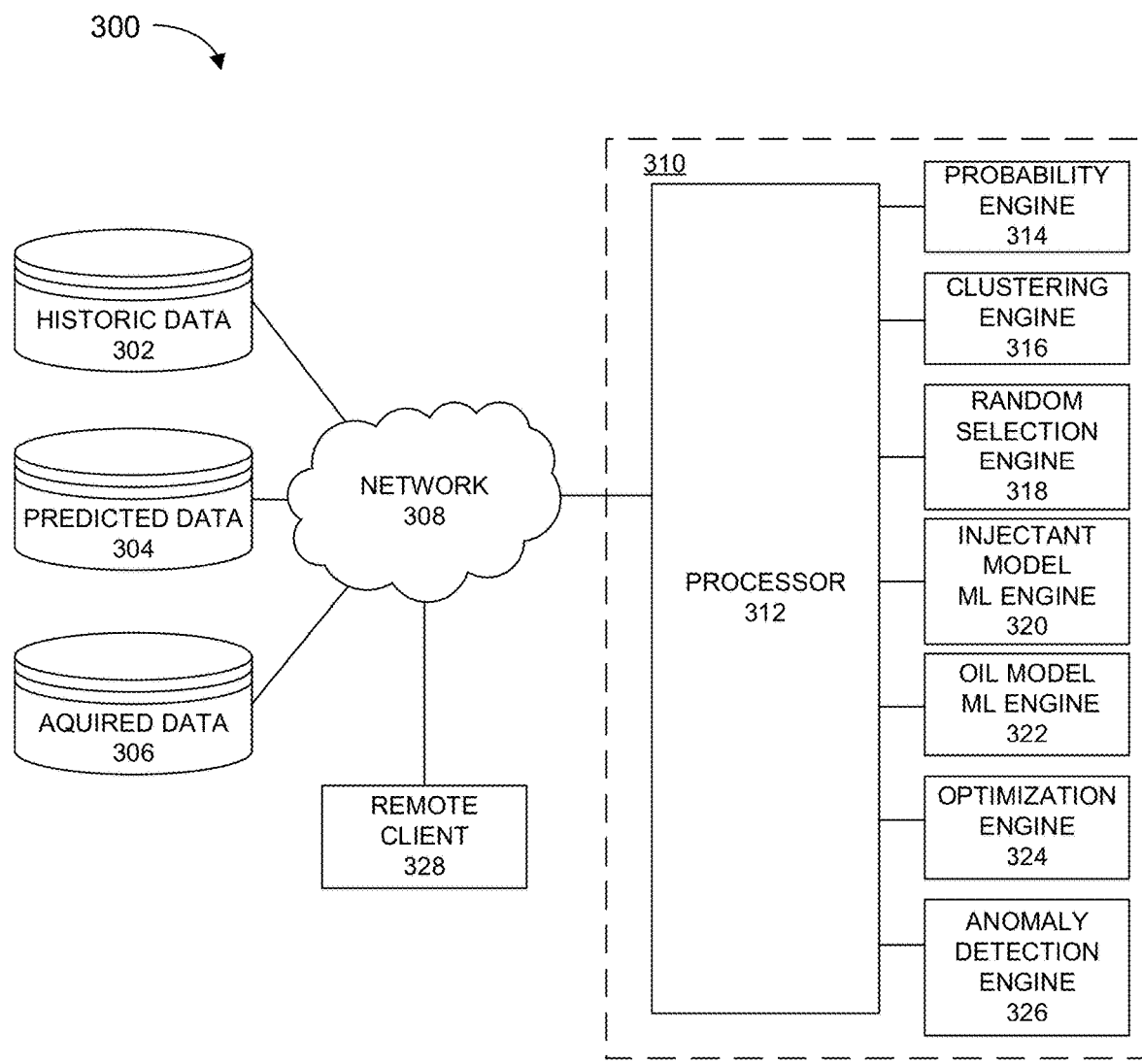
FIG. 3 is a schematic diagram of a system for generating a forecasted oil production rate as function of time in accordance with an embodiment of the present disclosure.

Referring now to FIG. 3, a schematic diagram of an example system 300 for performing a method generating a forecasted oil production rate according to the present disclosure is shown.

The system 300 includes a historic data database 302 for storing sets of historic data of previously operated wells, a predicted data database 304 for storing the sets of predicted geological data, and an actual data database 306 for storing actual data acquired for the well under consideration. Although databases 302 to 306 are illustrated in the schematic diagram in FIG. 3 as separate components, in practice these some or all of the databases 302 to 306 may be included within single database, or may be stored in a single memory (not shown), or any one of the databases 302 to 306 may be stored in multiple separate memories (not shown) distributed across the network 308.

The system 300 also includes a computing device 310 that may access the databases 302, 304, and 306 via a network 308. The network 308 may be any suitable network that facilitates transmitting data between the databases and the computing device 310, including a local area network (LAN), a wide area network (WAN), or a combination of LAN and WAN, and may include wired networks, wireless networks, or a combination of wired and wireless networks.

The computing device 310 includes a processor 312 for controlling the overall operation of the computing device 310. The processor 312 is coupled to a number of engines 314 to 326 that perform various functions of forecasting oil production rates for a well under consideration.

Although the processor 312 and the engines 314 to 326 are illustrated in the schematic diagram in FIG. 3 as separate components, in practice some or all of the processor 312 and the engines 314 to 326 may be included in a single hardware component. Further the engines 314 to 326 may be provided as any suitable combination of hardware and software.

The probability engine 314 determines the probabilities of the pluralities of sets of predicted geological data according to 104 and 204 as previously described. The clustering engine 316 performs the clustering analysis that groups the historic data into clusters and assigns the sets of predicted geological data to a cluster of historic data, as described previously. The random selection engine 318 selects one of the sets of predicted geological data based on a probability distribution generated by the probability engine 314. The optional injectant model machine learning (ML) engine 320 generates the predicted injectant rates as a function of time and the forecasted injectant rate as a function of time for production techniques that inject an injectant into the formation. A computer device utilized for forecasting production in wells that do not inject an injectant may omit the injectant model ML engine 320. The oil model ML engine 322 generates the predicted oil production rates as a function of time according to 114 and 214, as previously described, and may generate the forecasted oil production rate and associated uncertainty according to 120 and 220, as previously described. The optimization engine 324 determines the preferred operating parameter according to 122 and 222, as previously described. The anomaly detection engine 326 detects an anomaly in the actual data and triggers an alert in response to detecting an anomaly according to 226, as previously described.

The system 300 may include one or more remote clients 328. The remote client 328 may be utilized to access the databases 302 to 306 to, for example, provide sets of predicted geological data the predicted data database 304, or provide actual data to the actual data database 306, or to initiate a process of generating a forecasted oil production rate for a well, or a set of wells, or to receive any or all of the predicted steam rates, the forecasted oil production rates, the preferred operation parameter, or an alert of an anomaly. The system may also include, rather than or in addition to, a local client (not shown) that functions similarly to the remote client 328, but communicates with the computing device 310 directly rather than over the network 308.

Figure 4A:
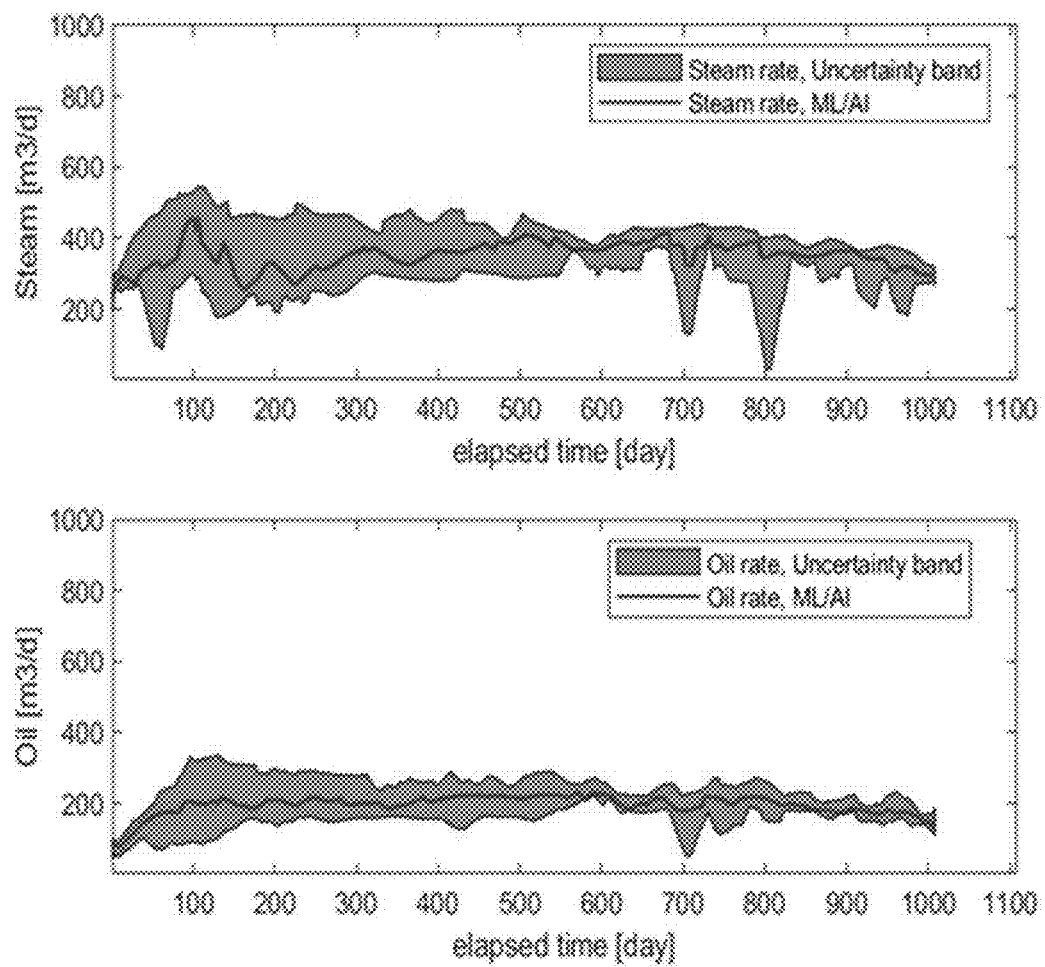
FIGS. 4A-4E are graphs showing example predicted steam rates and forecasted oil production rates according to embodiments of the present disclosure.
Figure 4B:
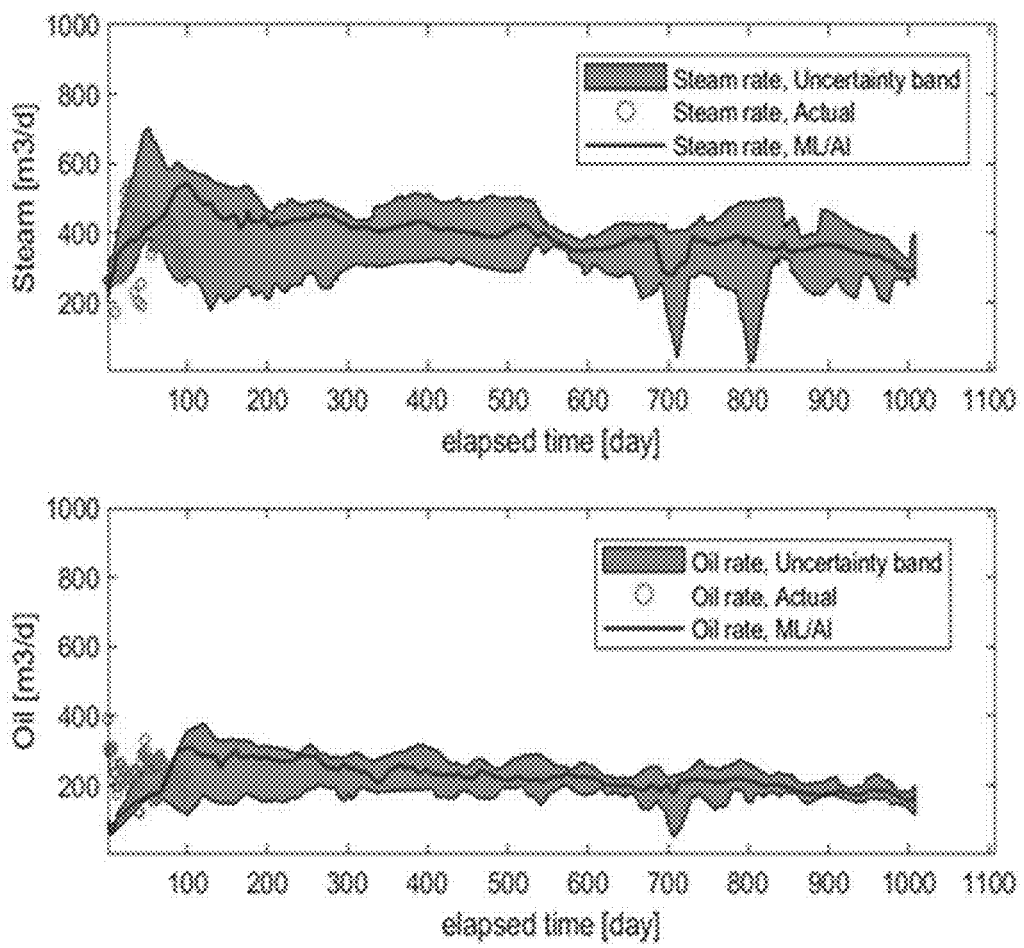
Figure 4C:
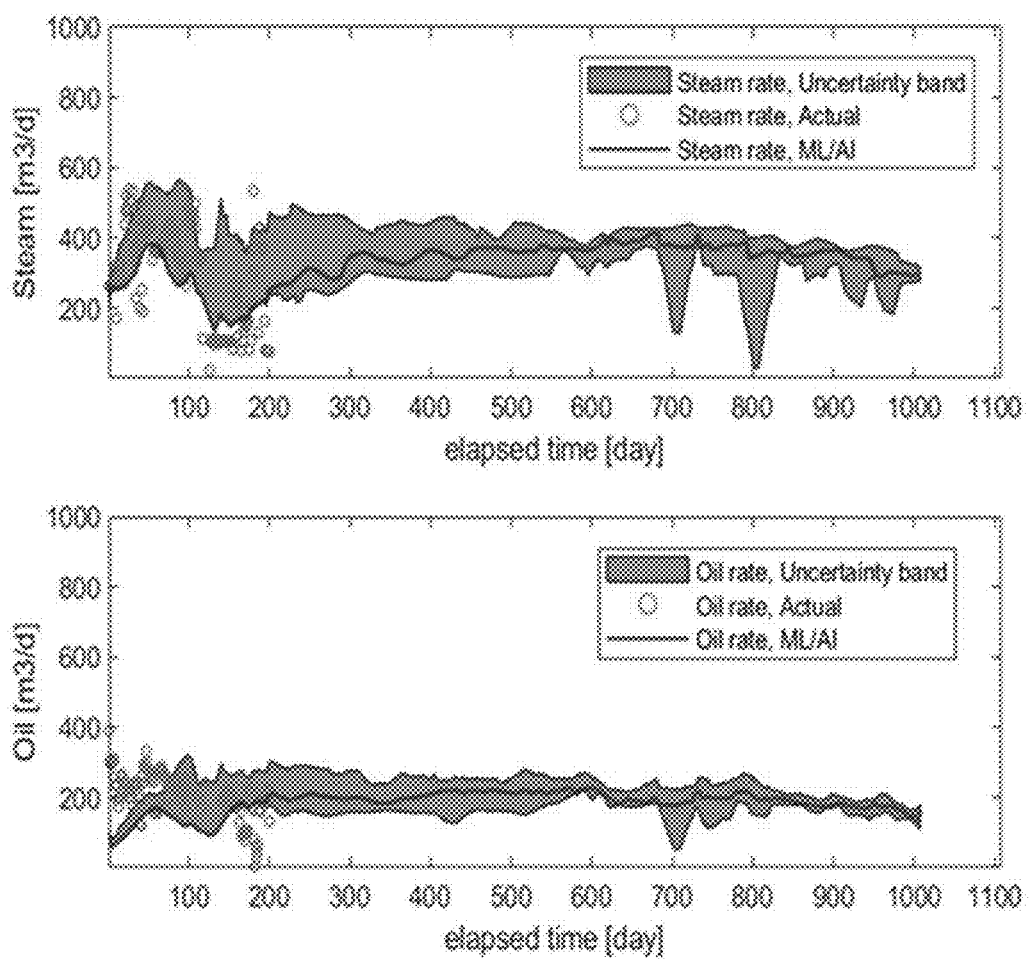
Figure 4D:
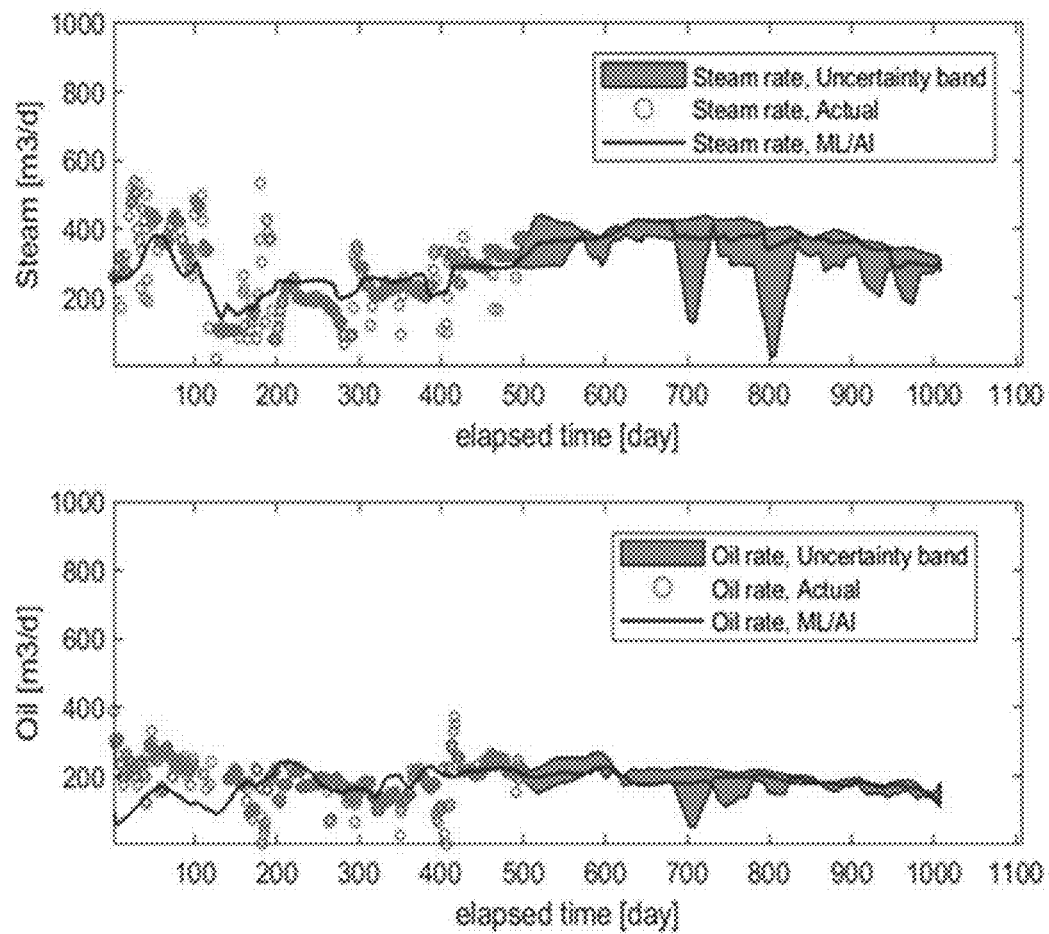
Figure 4E:
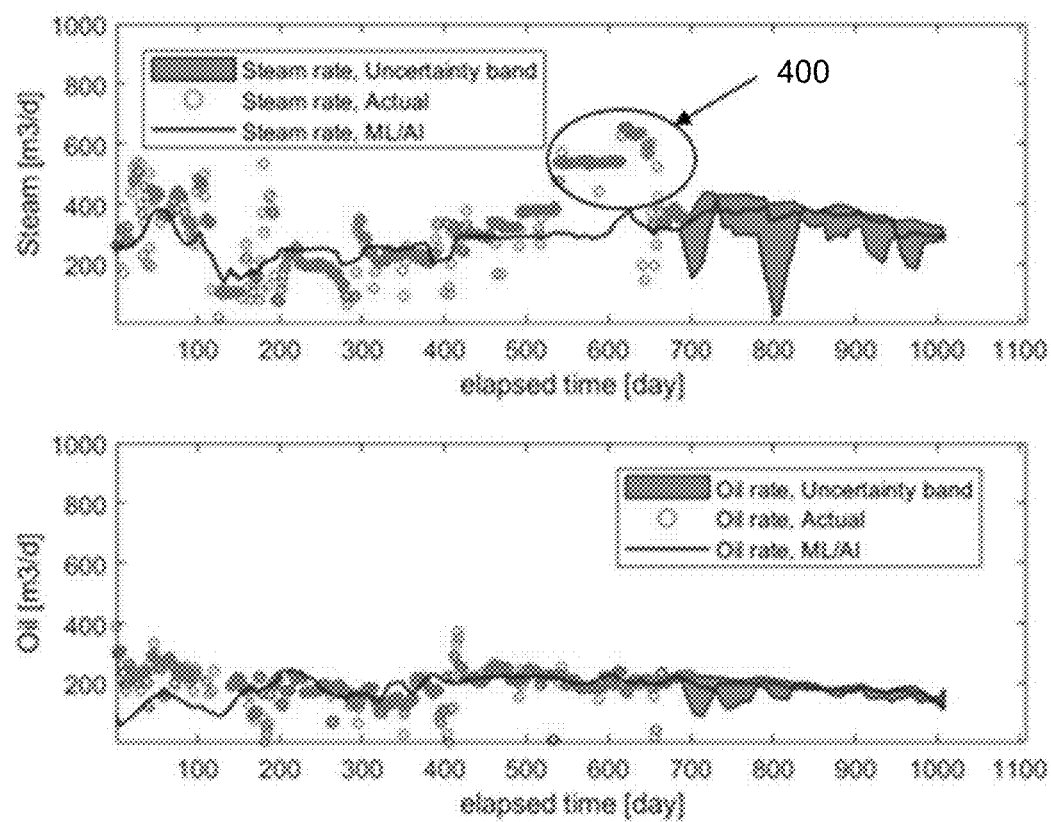

FIGS. 4A to 4E show forecasted injectant as a function of time, on top, and forecasted oil production rate as a function of time, on bottom, in accordance with the present disclosure for a SAGD operated well before any actual data is received (FIG. 4A), after receiving a 100 days of actual data (FIG. 4B), 200 days of actual data (FIG. 4C), 500 days of actual data (FIG. 4D), and 700 days of actual data (FIG. 4E). In FIGS. 4A to 4E, the median value of the forecasted injectant rate and the forecasted oil rates are shown as the solid lines, the uncertainties in the forecasted injectant rate and the forecasted oil production rates are shown as the shaded band around the solid line, and the actual data is shown as the circles.

As shown in FIG. 4A, at day zero, the prediction uncertainty interval at the early SAGD stage is relatively large due to having no actual production data and the high variability or uncertainty in the start-up and ramp-up phase of SAGD wells. A similar result can also be seen after production for 100 days (FIG. 4B) and 200 days (FIG. 4C), where the uncertainty in the forecasted injectant and oil production rates is still relatively high. As the forecasted injectant and oil productions rates and their associated uncertainty are updated as more data are obtained, the uncertainty band is reduced as can be seen in the predictions after 500 days of data (FIG. 4C). This is because the probabilities associated with the sets of predicted geological data, $P(P_{R_0}|P_{R_t})$, did not change significantly after 300 days of actual data was received in the example shown, which led to increased sampling of the same set of predicted geological data. After 300 days, convergence is seen in the stability of the uncertainty in FIGS. 4C to 4E.

As seen in FIG. 4E, there is a significant difference between the actual data and forecasted injectant rate and its associated uncertainty between days 500 and 700, indicated at 400. This anomaly may be detected, as described above with reference to 226 of the method illustrated with reference to FIGS. 2A and 2B. This anomaly indicates a suspicious case of over-injection because there is no corresponding increment in oil production. Quickly detecting this anomaly and triggering an alert facilitates implementation corrective measures in a much quicker manner compared to reservoir simulation.

Embodiments of the present disclosure provide a method and apparatus for generating real time oil production forecasting. Uncertainty in the generated forecasting may be quantified simultaneously with the generation of the forecasted oil production data and generation of the steam rate for thermal processes. The uncertainty includes both operational and geological uncertainty. The uncertainty in the generated forecasted oil production rate, and the predicted steam rate for thermal processes, may be utilized to identify anomalies in the actual data, triggering an alert which may be utilized to take corrective action. Such anomaly detection is not possible utilizing conventional modelling techniques that do not quantify uncertainty. Further, utilizing machine learning based models for predicting steam rate, for thermal processes, and forecasting oil production rate leads to faster forecasting compared to conventional numerical reservoir simulation, leading to reduction in computational costs. Determining optimal operating conditions, particularly by optimizing steam allocation in thermal processes such as SAGD, may result increased oil production with reduced steam usage, which may increase operational efficiency and reduce green house gas emission intensity.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method of producing oil in a steam-assisted gravity drainage (SAGD) system that includes at least one injector well and at least one producer well in a geological formation, the method comprising:
   i) training a machine learning based model to generate and output a predicted oil production rate as a function of time given predicted geological data for the geological formation and historical data as inputs, wherein the historical data comprises geological data and historical operational data from other geological formations geologically similar to the geological formation;
   ii) receiving a plurality of sets of predicted geological data for the geological formation and sets of historical data comprising the historical operational data, and clustering the sets of historical data into clusters based on geological similarity;
   iii) for each given set of predicted geological data of the plurality of sets of predicted geological data, determining a probability associated with the predicted geological data of the given set;
   iv) repeating for a number of iterations:
      a) selecting one set of the plurality of sets of predicted geological data using Monte Carlo sampling based on a probability distribution defined by probabilities for the plurality of sets of predicted geological data as determined in iii);
      b) assigning the selected one set of predicted geological data of a) to one cluster of the clusters of the historical data based on similarity of the one set of predicted geological data to geological data in the historical data in the one cluster;
      c) extracting the historical operational data and the geological data from the one cluster of historical data of b); and
      d) using the historical operational data and the geological data extracted from the one cluster of historical data in c) as input to the machine learning based model trained in i), which generates and outputs a predicted oil production rate as a function of time through the at least one producer well given the historical operational data and the geological data as inputs;
   v) generating a forecasted oil production rate at a particular time and an associated uncertainty from the predicted oil production rate of d) over the number of iterations of iv); and
   vi) operating the at least one injector well and the at least one producer well in the geological formation using at least one operational parameter determined from the forecasted oil production rate at the particular time and the associated uncertainty of v);
   wherein the operating of vi) includes injecting steam through the at least one injector well into the geological formation and producing oil extracted from the geological formation through the at least one producer well, and
   wherein the at least one operational parameter of vi) is selected from the group consisting of injector well bottom hole pressure, steam injection rate, or other operational parameter related to production of oil from the geological formation.

2. The method according to claim 1, further comprising:
generating a predicted injectant rate as a function of time for the selected set of predicted geological data by inputting into a machine learning based injectant model geological data included in the selected set of predicted geological data and the historical operational data from the historical operational data; and
generating the predicted oil production rate as a function of time by inputting the predicted injectant rate as a function of time into the machine learning based model.

3. The method according to claim 2, further comprising:
generating, based on the predicted injectant rates as a function of time, a forecasted injectant rate as a function of time, where at a particular time the forecasted injectant rate is determined based on the predicted injectant rates at the particular time, and the forecasted injectant rate at the particular time having an uncertainty defined by a range of predicted injectant rate values at the particular time.

4. The method of claim 1, further comprising:
receiving measured data from the well up to time t, the measured data including measured operational data and measured oil production rate data;
wherein determining the probability associated with the predicted geological data for each given set of predicted geological data of the plurality of sets of predicted geological data at iii) comprises:

inputting the measured operational data into the machine learning based model to generate a predicted measured oil production rate as a function of time up to time t; and determining the probability associated with the predicted geological data based on a difference between the predicted measured oil production rate and the measured oil production rate.

5. The method of claim 4, wherein generating the predicted oil production rate, for each set of historical geological data of the assigned cluster to which the selected set of predicted geological data belongs, comprises:

generating the predicted oil production rate as a function of time for times greater than time t by inputting into the machine learning based model geological data included in the selected set of predicted geological data and historical operational data from the set of historical data and utilizing the predicted measured oil production rate as the predicted oil production rate for times up to time t.

6. The method of claim 5, further comprising:

determining that the measured oil production rate for a particular time is outside of the uncertainty of the forecasted oil production rate; and in response to determining that the measured oil production rate for the particular time is outside of the uncertainty of the forecasted oil production rate, transmitting an alert.

7. The method of claim 5, further comprising:

inputting measured operational data that includes measured injectant rate as a function of time up to time t into a machine learning based injectant model to generate a predicted injectant rate as a function of time up to time t;

wherein generating the predicted oil production rate, for each set of historical geological data of the assigned cluster to which the selected set of predicted geological data belongs, comprises:

generating a predicted injectant rate as a function of time for the selected set of predicted geological data for time greater than time t by inputting into the machine learning based injectant model geological data included in the selected set of predicted geological data and historical operational data from the historical data; and generating the predicted oil production rate as a function of time by inputting the predicted injectant rate as a function of time for times up to time t and times greater than time t into the machine learning based model.

8. The method of claim 7, further comprising:

generating, based on the predicted injectant rates as a function of time, a forecasted injectant rate as a function of time, where at a particular time the forecasted injectant rate is determined based on the predicted injectant rates at the particular time, and the forecasted injectant rate at the particular time having an uncertainty defined by a range of predicted injectant rate values at the particular time;

determining that the measured injectant rate as a function of time for a particular time is outside of the uncertainty of the forecasted injectant rate for the particular time; and in response to determining that the measured injectant rate as a function of time for a particular time is outside of the uncertainty of the forecasted injectant rate, transmitting an alert.

9. The method of claim 7, further comprising:

generating, based on the predicted injectant rates as a function of time, a forecasted injectant rate as a function of time, where at a particular time the forecasted injectant rate is determined based on the predicted injectant rates at the particular time, and the forecasted injectant rate at the particular time having an uncertainty defined by a range of predicted injectant rate values at the particular time;

wherein the at least one operational parameter of vi) is determined by performing an optimization scheme utilizing the forecasted injectant rate as a function of time and the forecasted oil production rate as a function of time.

10. The method of claim 9, wherein:

the at least one operational parameter of vi) is injector well bottom hole pressure; and the optimization scheme includes an economic objective function determination based on the cost of steam injected into the at least one injector well in accordance with the forecasted injectant rate as a function of time and the value of the oil produced from the at least one producer well in accordance with the forecasted oil production rate.

11. The method of claim 1, wherein, prior to receiving any measured data from the SAGD system, determining, for each given set of predicted geological data of the plurality of sets of predicted geological data, a probability based on a ratio of the number of sets of historical data that is included within a type associated with the given set of predicted geological data to the total number of sets of historical data.

12. The method of claim 1, wherein the machine learning based model utilizes random forest machine learning.

13. The method of claim 1, wherein each given set of the plurality of sets of predicted geological data of the formation includes at least one of:

rich pay thickness;
non-rich pay thickness;
bottom water thickness;
rich vertical permeability;
non-rich vertical permeability;
rich porosity;
non-rich porosity;
bottom water porosity;
rich oil saturation;
non-rich oil saturation;
bottom water saturation; and
permeability of bottom water zone.

14. The method of claim 1, wherein the operational data extracted from the sets of historical data includes at least one of:

production start data;
electric submersible pump speed; and
injector bottom hole pressure.

15. The method of claim 1, further comprising:

updating the forecasted oil production rate at a particular time and associated uncertainty of v) using actual data received from the SAGD system.

16. The method of claim 1, wherein the plurality of sets of predicted geological data of ii) includes one or more of P10 to P95 data sets.

17. The method of claim 1, wherein the at least one operational parameter of vi) includes a dynamic variable that is input to the machine learning based model that generates and outputs the predicted oil production rate.

18. The method of claim 1, wherein the at least one operational parameter of vi) is determined by an optimizing routine that maximizes an objective function related to production of oil from the geological formation.

19. The method of claim 18, wherein the objective function is an economic objective function that relates to value of oil produced from the geological formation and costs to produce oil from the geological formation.

20. The method of claim 1, wherein the at least one operational parameter of vi) is determined by an optimizing routine that involves a genetic algorithm in which solutions are represented as chromosomes which together form a population, wherein the population is initialized randomly.

21. The method of claim 1, wherein the at least one operational parameter of vi) includes an uncertainty.

* * * * *